(12) United States Patent
Kondou et al.

(10) Patent No.: US 7,748,013 B2
(45) Date of Patent: Jun. 29, 2010

(54) CASE MEMBER AND CARTRIDGE FOR STORING AN INFORMATION MEDIUM

(75) Inventors: Hiroya Kondou, Okayama (JP); Kaoru Kajita, Okayama (JP)

(73) Assignee: Panasonic Corporation, Osaka (JP)

( * ) Notice: Subject to any disclaimer, the term of this patent is extended or adjusted under 35 U.S.C. 154(b) by 876 days.

(21) Appl. No.: 10/595,150

(22) PCT Filed: Mar. 7, 2005

(86) PCT No.: PCT/JP2005/003929
§ 371 (c)(1),
(2), (4) Date: Mar. 6, 2006

(87) PCT Pub. No.: WO2005/086164
PCT Pub. Date: Sep. 15, 2005

(65) Prior Publication Data
US 2009/0009909 A1 Jan. 8, 2009

(30) Foreign Application Priority Data
Mar. 8, 2004 (JP) ............................. 2004-063557

(51) Int. Cl.
*G11B 23/03* (2006.01)
(52) U.S. Cl. .................................... 720/728
(58) Field of Classification Search ............. 720/728
See application file for complete search history.

(56) References Cited

U.S. PATENT DOCUMENTS 5,077,625 A * 12/1991 Shiba et al. ............... 360/133
5,764,623 A * 6/1998 Akiyama et al. ........... 720/726
6,269,073 B1 * 7/2001 Goto et al. ................. 720/728
6,754,167 B1 * 6/2004 Nakashima ................ 720/728
6,831,888 B2 * 12/2004 Roberts .................... 720/728
6,940,806 B2 * 9/2005 Bae et al. ................ 369/291.1

FOREIGN PATENT DOCUMENTS

| EP | 0634748 | 1/1995 |
|---|---|---|
| JP | 2001126432 | 5/2001 |
| JP | 2002184151 | 6/2002 |
| JP | 2002288961 | 10/2002 |

OTHER PUBLICATIONS

European Search Report dated Mar. 6, 2008.

\* cited by examiner

*Primary Examiner*—David D Davis
(74) *Attorney, Agent, or Firm*—Snell & Wilmer L.L.P.

(57) ABSTRACT

A cartridge includes a case member (500) and a shutter member (100). The case member (500) includes a upper case section (505) and a lowercase section (506). A step portion (507) is formed at a boundary (508) between the upper case section (505) and the lower case section (506). The upper case section (505) includes a shutter pressing section (517) including a plurality of eaves sections (510). Each of the plurality of eaves sections (510) is configured to engage with the eaves engagement section (104) of the shutter member (100). At least two of the plurality of eaves sections (510) are located spaced apart from each other by a predetermined distance (519). The lower case section (505) includes a connection portion (520). The connection portion (520) is connected to the step portion (507) at a location between the at least two eaves sections (510), which are located spaced apart from each other by the predetermined distance (519), of the plurality of eaves sections (510).

12 Claims, 23 Drawing Sheets

PRIOR ART

PRIOR ART

CASE MEMBER AND CARTRIDGE FOR STORING AN INFORMATION MEDIUM

TECHNICAL FIELD

The present invention relates to a case member and a cartridge for storing an information medium having an information layer on which recording and/or reproduction (hereafter, recording/reproduction) can be performed for user information signals.

BACKGROUND OF THE INVENTION

When foreign substances such as dust or finger prints adhere to the surface of an information medium for recording user information signals, the recording properties of the information medium is greatly varied. Accordingly, it is usual to store the information medium within a cartridge in order to guarantee stable recording.

The main elements of the cartridge are: a medium storage section for storing an information medium within a case member obtained by integrating an upper half and a lower half; a window section for exposing a part of the stored information medium; a shutter member for opening/closing the window section; and a shutter pressing section for restricting the separation of the shutter member from the cartridge.

For example, in order to produce a cartridge for an magneto-optical recording medium or a phase-change-type write-once recording medium which is generally called "write-once", the case member, the shutter member and the shutter pressing section are formed individually, and then the shutter member is incorporated into the case member after the medium is stored within the case member, and then the shutter pressing section is attached to the case member by thermal fusion or adhesion. Thus, the shutter member is configured to appropriately operate the opening/closing operation.

In such a cartridge for the magneto-optical recording medium or a phase-change-type write-once medium, it is essentially necessary that the shutter member and the case member are formed as separate members so that the shutter member can slide on the case member. When the case member and the shutter pressing section are formed as separate members, the number of parts required for the cartridge is increased, and the number of steps required for producing the cartridge is increased due to the additional step of attaching the shutter pressing section to the case member. As a result, the cost of the cartridge is increased.

In general, the medium is stored within the medium storage section, and then the case member is assembled by integrating the upper half and the lower half. Then, the shutter pressing section is attached to the case member after the shutter member engages with the case member such that the shutter member can slide on the case member. Accordingly, the step of attaching the shutter pressing section to the case member is the final step.

However, the shutter pressing section may be attached to the case member such that the direction of the shutter pressing section is not parallel to the sliding direction of the shutter member. When the shutter pressing section is attached to the case member by using an adhesive, too much adhesive may cause the shutter member to be adhered to the case member and too little adhesive may cause insufficient adhesion. When the shutter pressing section is attached to the case member by using thermal fusion, the case member may be distorted during the fusion step. These problems may adversely effect the functioning of the cartridge. This causes low efficiency of the work and increase of the cost of the cartridge due to increase of the cost of materials.

In order to solve the problems described above, a method is proposed for integrally forming the shutter pressing section during the producing process of the upper half and the lower half. Recently, such a method is applied to most cartridges. In this method, the case member is made of resin and the upper half and the lower half are formed by using the injection molding process.

Reference 1 discloses a technique for integrally forming the shutter pressing section during the injection molding process.

FIGS. 9 to 11 are plan views illustrating the structure of the cartridge disclosed in Reference 1. In this example, the cartridge is a rewritable digital versatile disc cartridge (hereafter, simply referred to as a cartridge). The cartridge includes a shutter member 100 and a case member 200.

The shutter member 100 includes a sliding section 101 which slides on a sidewall of the case member 200; a shutter opener engagement section 102 which engages with a shutter opener (not shown) for sliding the shutter member 100; a window opening/closing section 103 which opens/closes a window section formed in the case member 200; and an eaves engagement section 104 which engages with the shutter pressing section.

The case member 200 includes: a sliding sidewall 201 which engages with the sliding section 101 of the shutter member 100 such that the sliding section 101 slides on the sliding sidewall 201; a rear sidewall 203 which is opposite to the sliding sidewall 201 across the window section 202; a pair of lateral sidewalls 204 connected to the sliding sidewall 201 and the rear sidewall 203; an upper case section 205 having a space defined by the rear sidewall 203 and the pair of lateral sidewalls 204; a lower case section 206 on which the window opening/closing section 103 slides, wherein a gap having a thickness which is substantially equal to the thickness of 103 is provided between the upper case section 205 and the lower case section 206; a boundary section 208 which defines a boundary between the upper case section 205 and the lower case section 206, wherein a step portion 207 is formed at the boundary such that the step portion 207 extends in a direction which is substantially parallel to the rear sidewall 203; a pair of open position regulating sections 209 which regulates the open range of the shutter member 100 by step portions, wherein the step portions are formed between the upper case section 205 and the lower case section 206 along the lateral sidewalls 204; an eaves section 210 which extends from the upper case section 205, for engaging with the eaves engagement section 104 of the shutter member 100; a medium storage section 211 for storing an information medium 300; a slide rib 212 which engages with the sliding section 101 of the shutter member 100 to guide the sliding of the sliding section 101; an alignment hole 213 having a prolonged shape and an alignment hole 214 having a circular shape, both of which engage with pins used in determining the position of the cartridge on a tray on which the cartridge is placed during a recording/reproduction operation of the recording/reproduction device.

The window section 202 includes: a rotation means entry portion 215 which allows a medium rotation driving means (not shown) for driving the rotation of the information medium 300 to be entered into the cartridge; and a head entry portion 216 which allows a head for sending/receiving user information signals for an information layer (not shown) of the information medium 300 to be entered into the cartridge.

The shutter pressing section 217 is formed by the eaves section 210 which engages with the eaves engagement section 104 of the shutter member 100; and the step portion 207 at the boundary section 208 within a range where the eaves section 210 extends along the boundary section 208 between the upper case section 205 and the lower case section 206.

Next, the shutter opening operation of the cartridge disclosed in Reference 1 will be described.

FIG. 9 is a plan view illustrating a cartridge in a state where the shutter member 100 closes the window section 202. In this state, the eaves section 210 is configured to completely cover the eaves engagement section 104. From this state, the shutter member 100 is moved in a direction (e.g. a direction toward the right side of the drawing sheet) while the shutter opener engages with the shutter opener engagement section 102, the window opening/closing section 103 slides on a surface of the lower case section 206. Thus, the window section 202 goes into an open state. As shown in FIG. 10, the window section 202 includes the rotation means entry portion 215 and the head entry portion 216.

The eaves section 210 engages with the eaves engagement section 104. This makes it possible to restrict the separation of the window opening/closing section 103 from the lower case section 206 and to guide the window opening/closing section 103.

The case member 200 and the eaves section 210 are integrally formed by the injection molding process, so that the case member 200 includes the eaves section 210. As a result, a projection plane obtained by projecting the eaves section 210 onto the lower case section 206 (i.e. a portion of the lower case section 206 positioned immediately below the eaves section 210) has an opening 218 which is bored through the lower case section 206 in a direction towards the information medium 300.

When the shutter member 100 is further moved in the direction toward the right side of the drawing sheet, the side surface of the window opening/closing section 103 is in contact with open position regulating section 209, and the window section 202 is completely opened, as shown in FIG. 11. Then, the rotation driving means for driving the rotation of the information medium 300 engages with a center hole 301 (actually, a turn table included in the medium rotation driving means enters into the rotation means entry portion 215 from one side of the cartridge and a clamper enters into the rotation means entry portion 215 from the other side of the cartridge, so that the information medium 300 is held by the turn table and the clamper) so as to drive the rotation of the information medium 300. Then, a head for sending/receiving user information signals for the information layer of the information medium 300 enters into the head entry portion 216 so that the head can be used to perform a recording/reproduction operation.

Next, the structure of the cartridge in the vicinity of the shutter pressing section 217 shown in FIGS. 9 to 11 will be described, with reference to FIGS. 12, 13A and 13B.

FIG. 12 is a plan view illustrating the cartridge with cutting lines in relation to FIGS. 13A and 13B. FIG. 13 is a cross-sectional view seen along the direction of arrow C, when the case member 200 is cut along a line C-C, which passes through the center of the rotation of the information medium 300 and which is perpendicular to the sliding direction. FIG. 13B is a cross-sectional view seen along the direction of arrow D, when the case member 200 is cut along a line D-D, which passes through an outer side portion of the center hole 301 within a range where the information medium 300 is held by the turn table and the clamper, and which is parallel to the line C-C shown in FIG. 13A.

In the cartridge, a direction along the rotation axis of the information medium 300 is referred to as a thickness direction (i.e. a direction towards the left and right sides of the drawing sheet), a direction perpendicular to the sliding sidewall 201 is referred to as a length direction (i.e. a direction towards the up and down sides of the drawing sheet), and a direction perpendicular to the length direction is referred to as a width direction.

With reference to FIGS. 13A and 13B, the dimensions are as follows:

The thickness of the eaves section 210 is 0.4 mm to 0.45 mm; The length of the eaves section 210 from the step portion 207 is 3.25 mm to 3.75 mm;

The gap between the eaves section 210 and the lower case section 206 along the thickness direction is 0.6 mm to 0.65 mm, wherein the eaves engagement section 104 is movably inserted into the gap; and The thickness of the lower case section 206 is 1.9 mm to 2.1 mm; the length of the lower case section 206 from the step portion 207 shown in FIG. 13A is 9.05 mm to 9.25 mm.

It is difficult to simply define the length of the opening 218 from the step portion 207, since the length of the opening 218 from the step portion 207 varies depending on the length of the eaves section 210 and the precision level of the mold used in the injection molding process. However, the length of the opening 218 from the step portion 207 is set to be 0.5 mm to 1.0 mm longer than the projection plane of the eaves section 210 onto the lower case section 206.

The gap in the thickness direction between the lower case section 206 and the information medium 300 held by the turn table and the clamper is approximately 1.1 mm to 1.7 mm, although it may vary due to wobbling of the information medium 300.

In any state other than the state where the information medium 300 is held by the turn table and the camper, the surface of the information medium 300 is in contact with the storage surface of the medium storage section 211. As a result, the surface of the information layer for the recording/reproduction of the information signals is in contact with the surface of the storage surface of the medium storage section 211. This may adversely effect the recording/reproduction properties.

In order to prevent this adverse influence on the recording/reproduction properties, it is general to provide a mount rib (not shown) which restricts contact with the information layer, in the vicinity of the rotation means entry portion 215 and between the lower case section 206 and the information medium 300. The thickness of the lower case section 206 including the mount rib is 2.1 mm to 2.2 mm. As a result, the gap in the thickness direction between the mount rib and the Information medium 300 is narrowed by approximately 0.1 mm.

In addition, as shown in FIGS. 13A and 13B, the opening 218 is located at a portion of the lower case section 206 immediately below the eaves section 210.

FIG. 14 is a perspective view of the relevant parts of the cartridge shown in FIG. 13A. FIG. 14 shows a structure around the shutter pressing section 217 which is formed by the eaves section 210, the step portion 207 and the opening 218.

Reference 1: Japanese laid-open patent publication No. 2002-184151 (paragraphs 0002 and 0021; FIGS. 2 and 7).

DISCLOSURE OF THE INVENTION

As described above, the opening 218 inevitably exists immediately below the eaves section 210. The opening 218 is required because when it is required to process a mold precisely enough to realize a gap between the eaves section 201 and the lower case section 206 such that the eaves engagement section 104 can be movably inserted into the gap, it is impossible to release the mold while maintaining such a high level of preciseness in the mold.

As described above, the case member 200 is obtained by attaching an upper half and a lower half to each other. As shown in FIG. 14, the opening 218 is closest to the rotation means entry portion 215 along the cross-section of the lower case section 206, and the cross-section of the lower case section 206 is at the center of the opening 218 along the width direction. From FIG. 14, it is understood that the lower case section 206 is fragile in terms of mechanical strength, and it is distorted most easily when some kind of forces are applied in the thickness direction.

Further, resin which is generally used to produce the case member 200 is, for example, polycarbonate and acrylonitrile-butadiene-styrene resin and the like in view of the applicability of the injection molding process. The thickness of the lower case section 206 is around 2 mm. Thus, the lower case section 206 behaves as if it were a board spring, in terms of the material and the shape of the lower case section 206.

The opening operation of the shutter member 100 described with reference to FIGS. 9 to 11 is performed, when the cartridge is placed on the tray 401 included in the recording/reproduction device, as shown in FIGS. 15 and 16.

As described with reference to FIG. 11, after the window opening/closing section 103 opens the window section 202, the information medium 300 is held by a turn table and a clamper so that the information medium 300 is rotated at a high speed by the medium rotation driving means. The position of the cartridge needs to be determined with respect to the tray 401.

In FIG. 15, the cartridge is placed on the tray 401 against the pressing forces from the cartridge pressing member 402, and then the shutter opener 403 engages with the shutter opener engagement section 102 in the process of loading the cartridge into the recording/reproduction device (not shown), and then the window section 202 goes into an open state by the window opening/closing section 103.

In order to properly engage the medium rotation driving means with the center hole 301 of the information medium 300, it is necessary to accurately determine the position of the cartridge on the tray 401. The position of the cartridge is determined by engaging alignment pins (not shown) with alignment holes 213 and 214.

When the cartridge is simply placed on the tray 401, the alignment pins merely engage with the alignment holes 213 and 214. In this case, the cartridge cannot resist against the reverse action of the sliding force of the shutter opener engagement section 102 by the shutter opener 403. Therefore, it is not possible to determine the position of the cartridge on the tray 401.

When it is not possible to determine the position of the cartridge, it is not possible to accurately locate the medium rotation driving means with respect to the rotation center axis of the center hole 301 of the information medium 300, for example. Thus, there may occur a problem that the medium rotation driving means cannot drive the rotation of the information medium 300 on a plane which is perpendicular to the rotation center axis.

As described above, the case member 200 is obtained by integrating the upper half and the lower half by thermal fusion and the like. This may cause distortion in the cartridge due to a pressure applied to the cartridge during the integration step. As a result, there may occur another problem that the tops of the alignment pins do not engage with the alignment holes 213 and 214.

When the cartridge is placed on the tray 401 at a position shifted from the appropriate position, the turn table and the clamper may chuck the peripheral portion of the rotation means entry portion 215. As a result, there may occur another problem that the cartridge is rotated violently within the tray 401, so as to adversely effect the tray 401 and/or the cartridge.

In order to solve the problems described above, for example, the DVD specifications for Rewritable Disc (DVD-RAM) Part 1, PHYSICAL SPECIFICATIONS Version 2.0 defines that a surface distortion should be measured by applying predetermined pressures 404, 405 and 406 to the cartridge.

In accordance with this DVD standard, the recording/reproduction device also adopts a structure in which the position of the cartridge on the tray 401 is determined by applying the pressing forces 404, 405, and 406 as shown in FIG. 15.

In FIG. 15, the pressing forces are applied to the three points. This makes the structure of the recording/reproduction device more complicated, and increases the number of parts required for the recording/reproduction device.

As shown in FIG. 16, it is possible to adopt a structure in which pressing forces 407 and 408 are applied to the upper case section 205 at positions slightly near the rear sidewall 203 from the center of the cartridge along the loading direction (i.e. the longitudinal direction of the window opening/closing section 103).

It is assumed that either the pressing forces 404 to 406 are applied to the cartridge at the three points or the pressing forces 407 and 408 are applied to the cartridge at the two points. In this case, if both the cartridge and the tray 401 are in a completely planar state, then any distortion does not occur in the cartridge. However, actually, it is impossible that both the cartridge and the tray 401 are in a completely planar state, since the cartridge and the tray 401 are made of resin.

According to a method for producing the case member 200 of the cartridge by integrating the upper half and lower half by thermal fusion, which is commonly used, the pressures are applied to the cartridge during the heating process in the thermal fusion step. As a result, the distortion often occurs in the cartridge.

In addition, when the mold is released in the process of the injection molding of the upper half and the lower half, some distortion may occur in the cartridge due to an internal stress caused by the temperature difference in the resin.

Even if there is no distortion in the cartridge, it is possible that some distortion occurs in the tray 401. In this case, it is possible that some distortion occurs in the cartridge due to the distortion in the tray 401 when some pressing forces are applied to the cartridge.

The external forces and the internal stress applied to the cartridge are received by the case member 200. The distortion occurring in the case member 200 due to these external forces and internal stress is concentrated into the most mechanically-fragile part of the cartridge.

The most mechanically-fragile part of the cartridge is, as described above, the cross-section of the lower case section 206 when the lower case section 206 is cut along the center line of the eaves section 210 in the direction along the sliding sidewall, as shown in FIG. 13A.

As described with reference to FIG. 14, the most mechanically-fragile part of the cartridge is a portion where the sidewall of the rotation means entry portion 215 is positioned closest to the step portion 207.

As shown in FIG. 17, the resultant of forces derived from the external forces or the internal stress is concentrated into a portion indicated by an arrow, for example. As a result, there occurs distortion in the cartridge as shown in the broken line.

Due to the distortion in the cartridge, there may occur a problem that the information medium 300 may be scratched by the sliding contact between the surface of the lower case section 206 which faces the information medium 300 and the surface of the information medium 300. There may occur another problem that the information medium 300 and/or the lower case section 206 may get rubbed so as to produce powder dust.

When the resultant of forces derived from the external forces or the internal stress is concentrated into a portion indicated by an arrow shown in FIG. 17, the amount of distortion easily reaches approximately 0.5 mm.

In addition, a mount rib (not shown) is actually provided circumferentially on the lower case section 206 at a portion which faces the information medium 300 in the peripheral portion of the rotation means entry portion 215.

According to this structure, the distance between the lower case section 206 and the information medium 300 is further reduced. This increases a risk that the information medium 300 may be in sliding contact with the lower case section 206 or the mount rib, due to the wobbling of the lower case section 206, the mount rib and the information medium 300. This is one of the main reasons for malfunction of the cartridge.

When the resultant of forces is applied to the cartridge in a direction opposite to the direction indicated by an arrow shown in FIG. 17, the distance between the eaves engagement section 104 and the eaves section 210 is reduced, and the sliding properties of the shutter member 100 is degraded. This degraded portion is separate from a portion where the opening force and the closing resilient force for the shutter member 100 are applied (i.e. the side edge surface of the sliding section 101 along the sliding direction). As a result, the direction along the sliding operation of the shutter member 100 is inclined with respect to the sliding direction. Thus, the opening/closing operation cannot be performed and the cartridge cannot function.

It is preferable that the length and the width of the eaves section 206 are larger in view of stability of the sliding operation of the shutter member 100. However, when the length and the width of the eaves section 206 are larger, the area size of the opening 218 becomes equivalently larger. As a result, the amount of distortion is further increased and the malfunction rate is further increased.

The present invention is made in view of these conventional problems described above. One purpose of the present invention is to provide a case member and a cartridge which have a shutter member with extremely good sliding properties.

The case member of the present invention is used in a cartridge including a shutter member. The case member is for storing an information medium having an information layer. The case member includes: a lower case section including a sliding sidewall and a window section configured to allow at least a head to be inserted, the head being used to perform a recording operation or a reproduction operation for the information layer; and an upper case section including a rear sidewall which is opposite to the sliding sidewall. The shutter member includes: a sliding section operable to slide along the sliding sidewall of the case member; a window opening/closing section operable to open/close the window section of the case member in accordance with a sliding motion of the sliding section; and an eaves engagement section operable to engage with at least a part of the upper case section. A step portion is formed at a boundary between the upper case section and the lower case section, the upper case section includes a plurality of eaves sections, each of the plurality of eaves sections is configured to engage with the eaves engagement section of the shutter member, at least two of the plurality of eaves sections are located spaced apart from each other by a predetermined distance, the lower case section includes a connection portion, and the connection portion is connected to the step portion at a location between the at least two eaves sections, which are located spaced apart from each other by the predetermined distance, of the plurality of eaves sections.

In addition, the cartridge of the present invention includes a case member having the structure described above and a shutter member.

According to the present invention, by having the structure described above, it is possible to maintain the sliding properties of the shutter member, while realizing the accuracy in determining the position of the case member with respect to the tray, even if there is distortion in the case member and/or the tray.

Figure 1:
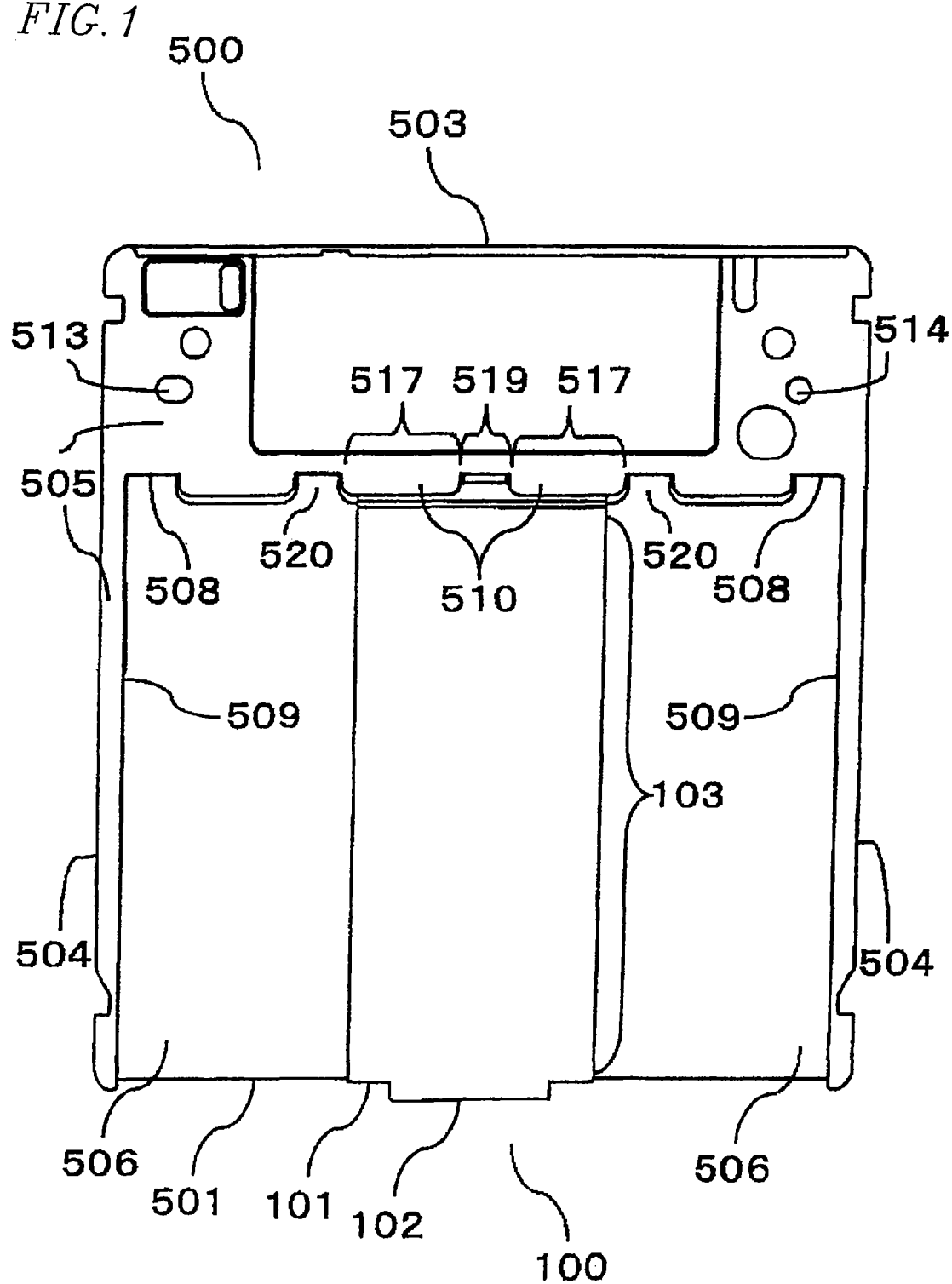
FIG. 1 is a plan view illustrating an cartridge of an embodiment according to the present invention, in a state where the window section is closed.

100 Shutter member
101 Sliding section
103 Window opening/closing section
104 Eaves engagement section
500 Case member
501 Sliding sidewall
502 Window section
503 Rear sidewall
504 Lateral sidewall
505 Upper case section
506 Lower case section
507 Step portion
508 Boundary
510 Eaves section
511 Medium storage section
515 Rotation means entry portion
516 Head entry portion
517 Shutter pressing section
518 Opening
519 Distance between eaves sections
520 Connection portion
300 Information medium

BEST MODE FOR CARRYING OUT THE INVENTION

In the case member and the cartridge according to the present invention, the case member includes: a lower case section including a sliding sidewall and a window section configured to allow at least a head to be inserted; and an upper case section including a rear sidewall which is opposite to the sliding sidewall. The head is used to perform a recording operation or a reproduction operation for the information layer. The shutter member includes: a sliding section operable to slide along the sliding sidewall of the case member; a window opening/closing section operable to open/close the window section of the case member in accordance with a sliding motion of the sliding section; and an eaves engagement section operable to engage with at least a part of the upper case section. A step portion is formed at a boundary between the upper case section and the lower case section. The upper case section includes a plurality of eaves sections. Each of the plurality of eaves sections is configured to engage with the eaves engagement section of the shutter member. At least two of the plurality of eaves sections are located spaced apart from each other by a predetermined distance. The lower case section includes a connection portion. The connection portion is connected to the step portion at a location between the at least two eaves sections, which are located spaced apart from each other by the predetermined distance, of the plurality of eaves sections.

According to the case member and the cartridge having the structure described above, the connection portion is provided at a fragile portion in a cartridge having the conventional structure. The provision of the connection portion disperses the resultant of forces derived from the distortion of the case member. This makes it possible to solve the problem that the lower case portion is in sliding contact with the information medium or the eaves section is in sliding contact with the eaves engagement section. As a result, it is possible to effectively have both of the sliding properties of the shutter member and the recording and/or reproduction properties for the information medium.

It is preferable that the connection portion is formed to have a planar shape and a surface of the connection portion and a surface of the lower case section form the same surface. According to this structure, it is possible to realize good sliding properties between the connection portion and the eaves engagement section. It is also possible to improve the mechanical strength of the connection portion.

It is preferable that an area obtained by projecting each of the plurality of eaves sections onto the lower case section is substantially equal to an area of an opening through the lower case section. According to this structure, it is possible to integrally form a half having the eaves sections in at least one of the upper half and the lower half by injection molding process in mass production. As a result, it is possible to provide a cartridge at lower cost while maintaining the necessary properties.

It is preferable that the plurality of eaves sections are located substantially symmetrically with respect to a center line connecting a center of the sliding sidewall to a center of the rear sidewall. According to this structure, it is possible to securely restrict the separation of the shutter member which is operable to slide to the left side or the right side from the lower case section. As a result, it is possible to guarantee the high reliability in recording and/or reproduction for the information medium having information layers on both sides, for example.

It is preferable that the lower case section includes a connection portion formed on the center line described above. According to this structure, it is possible that the connection portions is provided at the most fragile portion in a cartridge having the conventional structure.

It is preferable that each of the at least two eaves sections, which are located spaced apart from each other by the predetermined distance, of the plurality of eaves sections, has a width along a direction in which the sliding section is operable to slide, the width is greater than the predetermined distance, and the eaves engagement section of the shutter member is configured to engage with at least one of the plurality of the eaves sections, even if the shutter member is in an open state. According to this structure, it is possible to maintain the engagement relationship between the eaves sections and the eaves engagement section. It is also possible to restrict the separation of the eaves engagement section from the lower case section, even in a state where the window opening/closing section is not located over the window section.

Hereinafter, the cartridge of an embodiment according to the present invention will be described with reference to the drawings. Please note that, in the embodiments of the present invention described below, reference numerals having the same lowest two digits are assigned to the elements having the same function, and the description of the same function will be simplified in order to avoid the same description.

Figure 2:
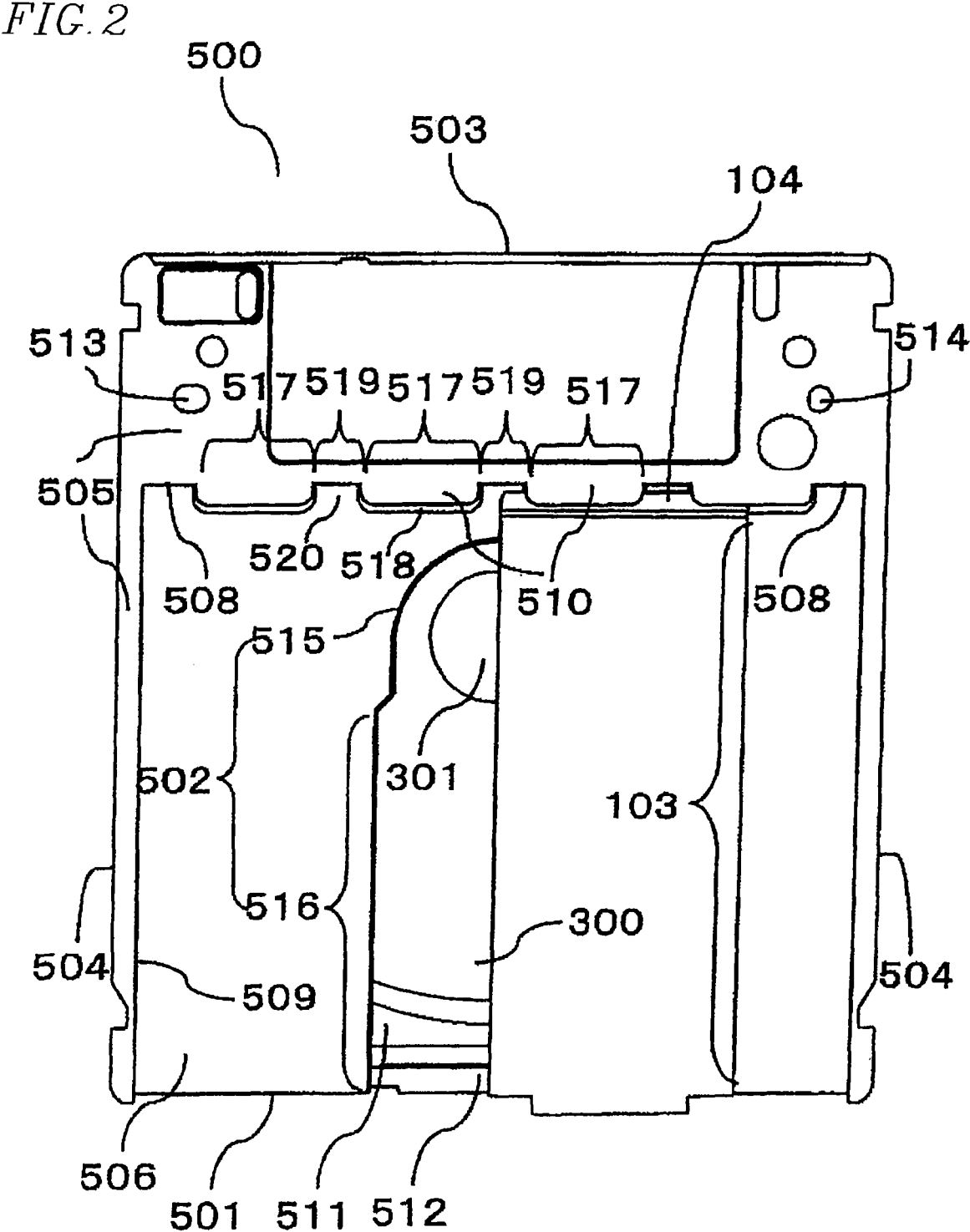
FIG. 2 is a plan view illustrating the cartridge of the same embodiment in a state where the window section is half opened.
Figure 3:
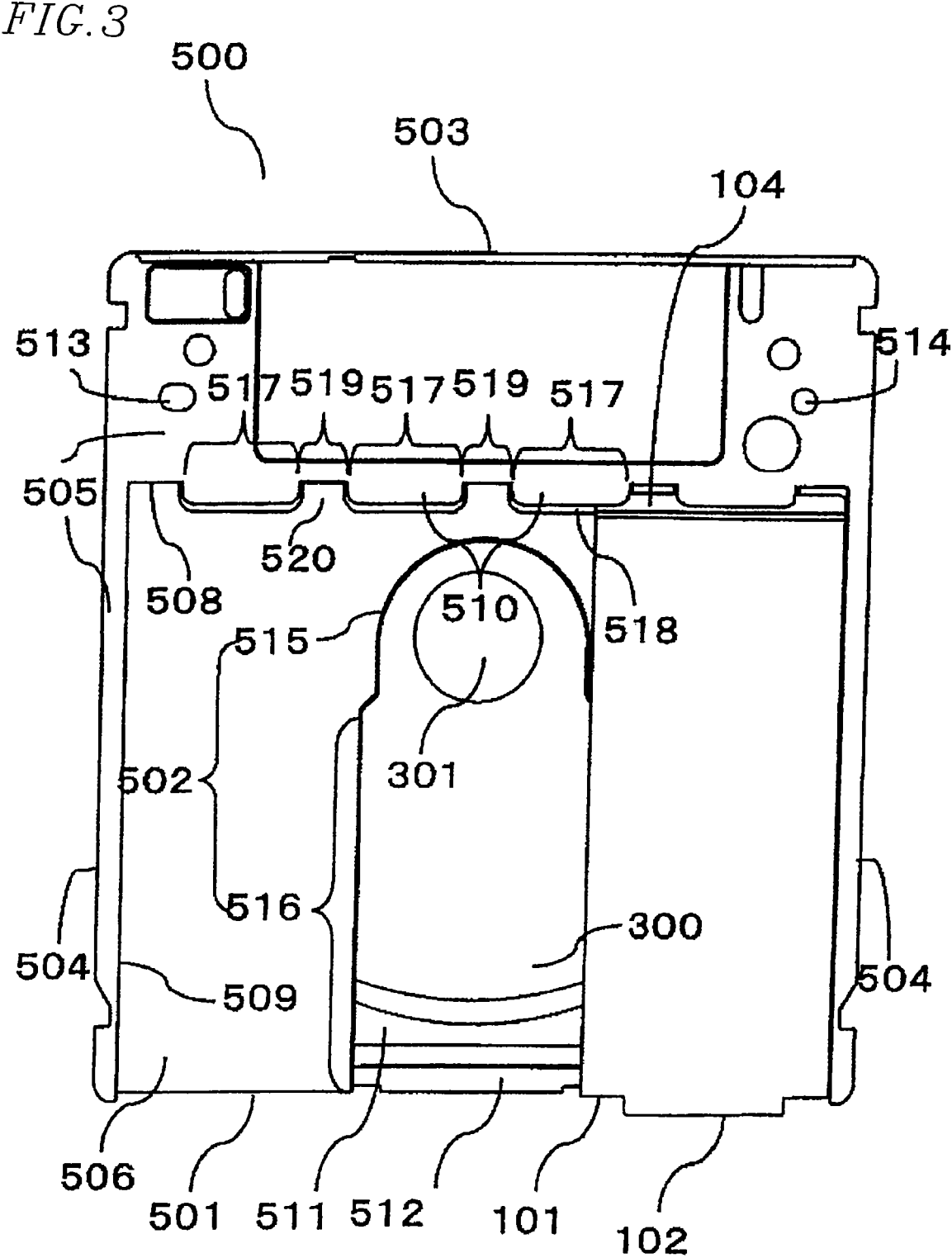
FIG. 3 is a plan view illustrating the cartridge of the same embodiment in a state where the window section is opened.

FIGS. 1 to 3 are plan views illustrating a structure of a cartridge of an embodiment according to the present invention. These Figures show a process in which the shutter member 100 slides on the sliding sidewall 501 and the lower case section 506, and the shutter member 100 opens the window section 502.

The cartridge of the present invention includes a case member 500 for storing an information medium 300 having an information layer and a shutter member 100.

The case member 500 includes a lower case section 506 including the sliding sidewall 501 and an upper case section 505 including a rear sidewall 503 which is opposite to the sliding sidewall 501. The upper case section 505 and the lower case section 506 are, for example, integrally formed. The lower case section 506 includes a window section 502. The window section 502 is configured to allow at least a head to be inserted. The head is operable to perform a recording operation or a reproduction operation for the information layer of the information medium 300 stored in the case member 500.

The shutter member 100 includes a sliding section 101 operable to slide along the sliding sidewall 501 of the case member 500, a window opening/closing section operable to open/close the window section 502 of the case member 500 in accordance with a sliding motion of the sliding section 101 and an eaves engagement section 104 operable to engage with at least a part of the upper case section 505.

A step portion 507 (see FIGS. 5A and 5B) is formed at a boundary 508 between the upper case section 505 and the lower case section 506.

The uppercase section 505 includes a shutter pressing section 517 which includes a plurality of eaves sections 510. Each of the plurality of eaves sections 510 is configured to engage with the eaves engagement section 104 of the shutter member 100. At least two of the plurality of eaves sections 510 are located spaced from each other by a predetermined distance 519.

The lower case section 506 includes a connection portion 520. The connection portion is connected to the step portion 507 at a location between the at least two eaves sections 510, which located spaced from each other by a predetermined distance 519, of the plurality of eaves sections 510.

The connection portion 520 is formed to have a planar shape, for example. The thickness of the connection portion 520 may be smaller than or equal to that of the lower case section 506. It is acceptable that the connection portion 520 may be slanted or may have a depression. However, it is preferable in releasing the mold during the injection molding process and in the mechanical strength described later that a surface of the connection portion 520 and a surface of the lower case section 506 form the same surface.

The area obtained by projecting each of the plurality of eaves sections 510 onto the lower case section 506 is substantially equal to the area of an opening 518 which is bored through the lower case section 506 (In general, the opening 518 is configured such that the size of the opening 518 is slightly larger than the size of the eaves section 510, and the shape of the eaves section 510 and the shape of the opening 518 are congruent or similar to each other). The opening 518 is formed to be in contact with the boundary 508 between the upper case section 505 and the lower case section 506.

A gap between each of the plurality of eaves sections 510 and the lower case section 506 is equally formed for all of the plurality of eaves sections 510. A gap is provided between an edge wall of the eaves engagement section 104 and the step portion 507. The eaves engagement section 104 is opposite to the sliding section 101 across the window opening/closing section 103. Accordingly, it is possible to prevent the separation of the window opening/closing section 103 from the lower case section 506 in accordance with the sliding motion of the sliding section 101 along the sliding sidewall 501. It is also possible to guarantee good slidability of the shutter member 100.

Next, the relationship between the eaves section 510, the opening 518 and the connection portion 520 will be described with reference to FIGS. 4, 5A and 5B.

Figure 4:
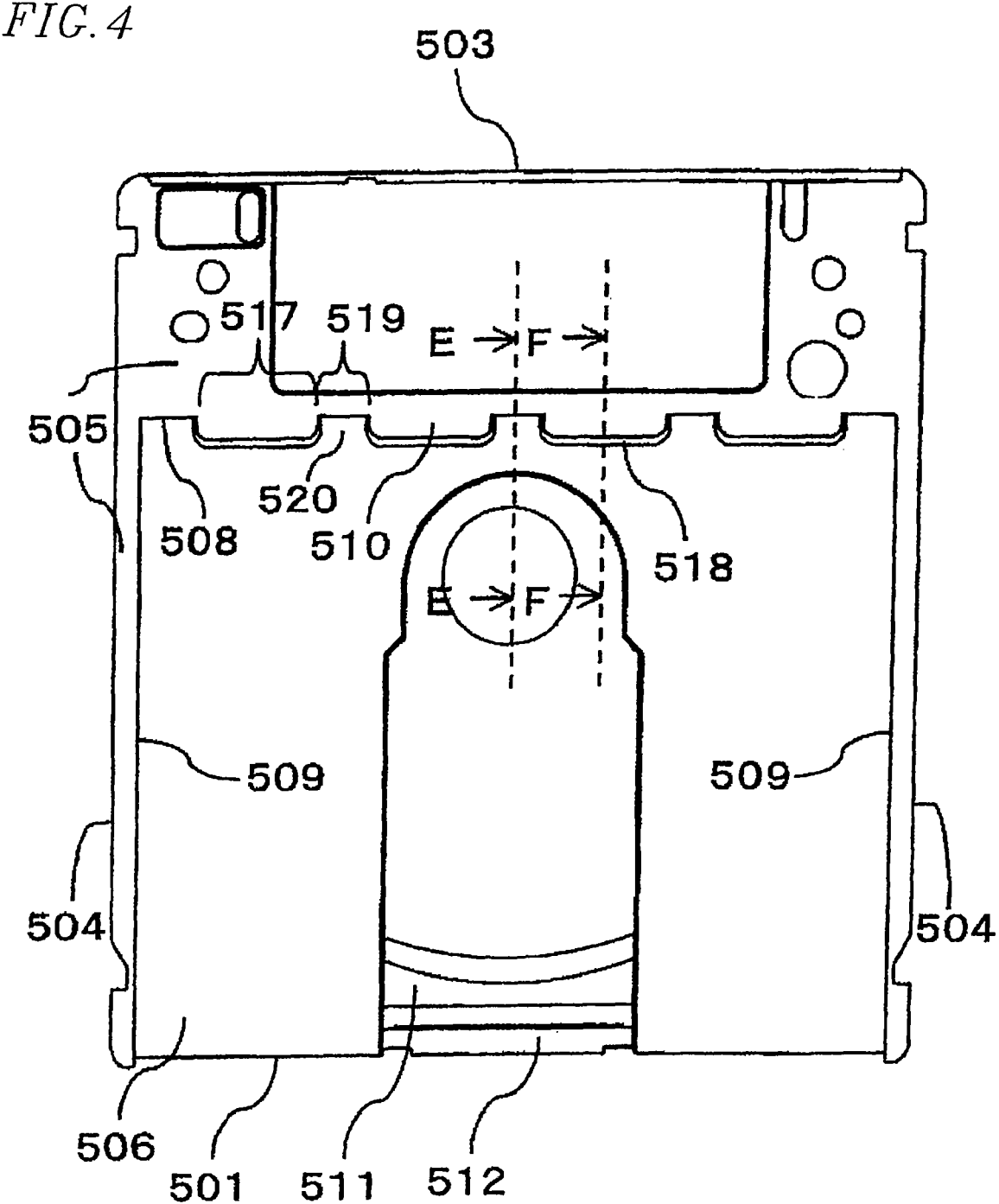
FIG. 4 is a plan view illustrating the cartridge of the same embodiment with cutting lines in relation to FIGS. 5A and 5B.
Figure 5A:
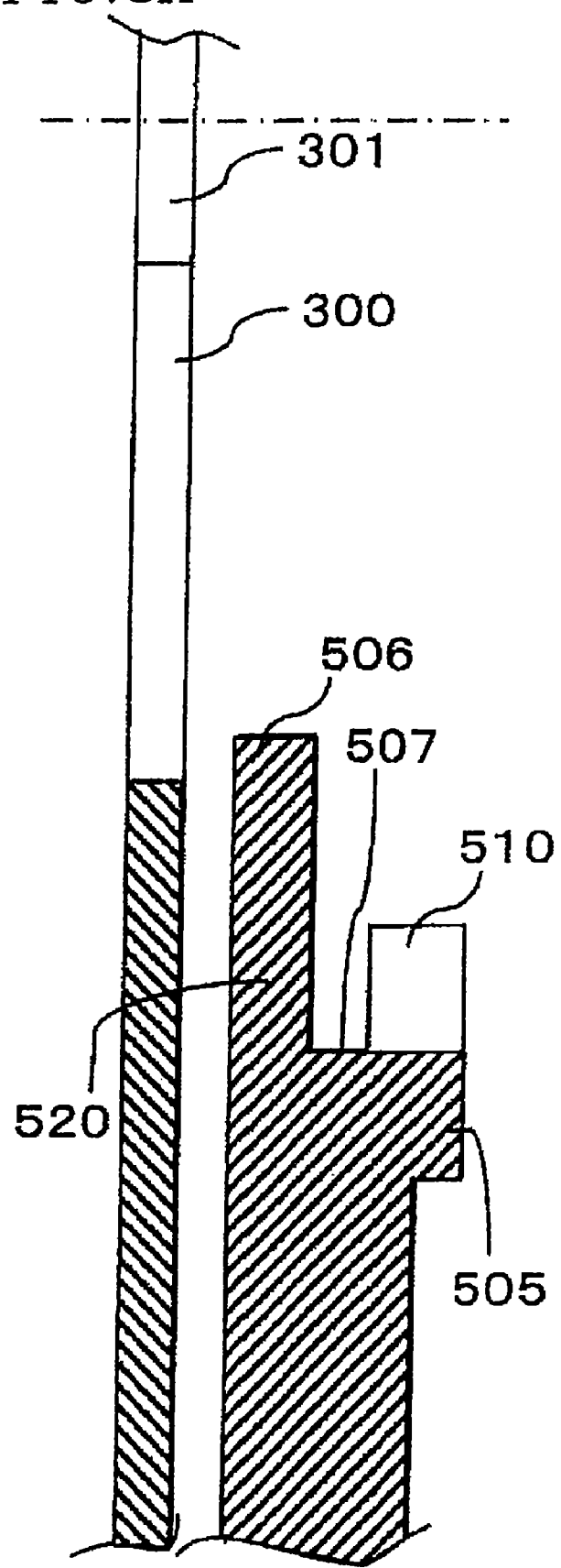
FIG. 5A is a cross-sectional view of the relevant parts of the center portion of the cartridge.
Figure 5B:
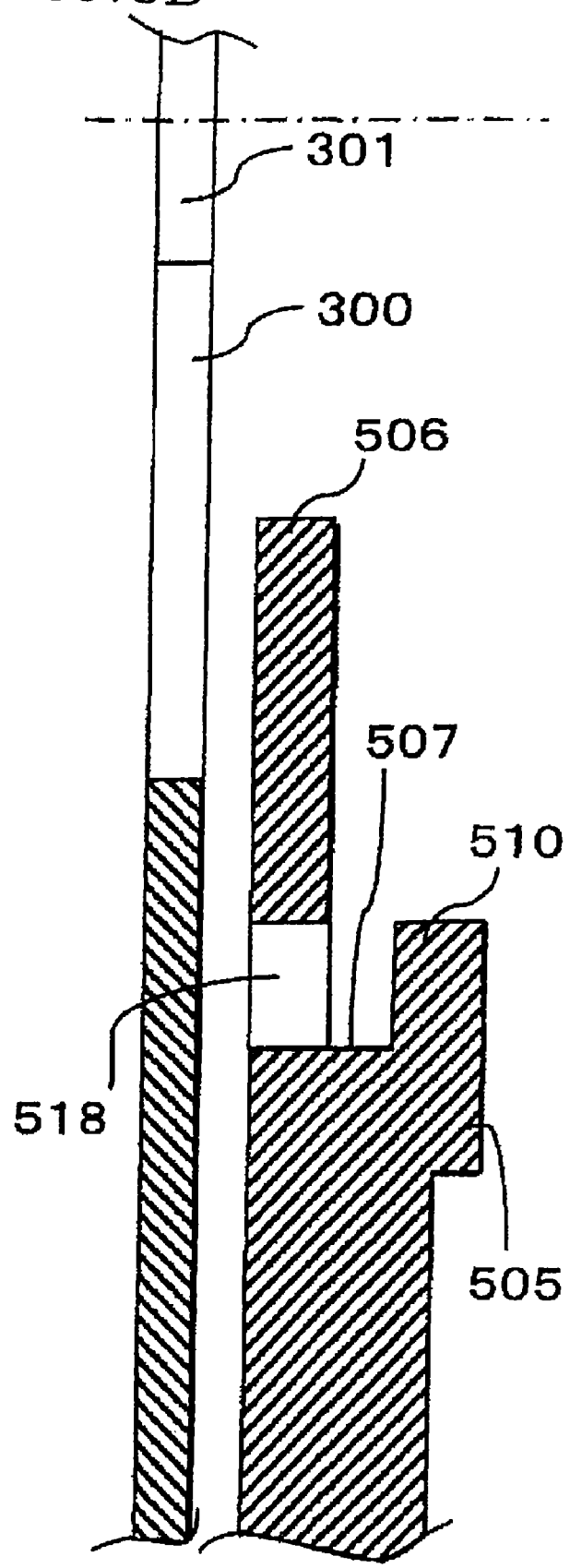
FIG. 5B is a cross-sectional view of the relevant parts of the peripheral portion of the window section of the cartridge.

FIGS. 5A and 5B show a cross-section of the case member 500 shown in FIG. 4. FIG. 5A is across-sectional view seen along the direction of arrow E, when the case member 500 is cut along the center line E-E of the case member 500 (i.e. the center line of a pair of the open/close position regulating sections 509, 509). FIG. 5B is a cross-sectional view seen along the direction of arrow F, when the case member 500 is cut along a line F-F which is parallel to the center line E-E of the case member 500 and which to across the eaves section 510 in the vicinity of the center line E-E and the rotation means entry section 515.

As shown in FIG. 5A, at the center line of the case member 500, the lower case section 506 has no openings unlike the conventional structure and is connected to the step portion 507 via the connection portion 520.

In the present embodiment of the invention, the case member 500 is configured such that the thickness of the connection portion 520 is the same as the thickness of the lower case section 506, and such that the lower case section 506 is directly connected to the step portion 507. However, as described above, the thickness of the connection portion 520 may be smaller than or equal to the thickness of the lower case section 506.

As shown in FIG. 5B, a plurality of openings 518 are provided in the lower case section 506 such that the plurality of openings 508 correspond to the plurality of eaves sections 510 provided in the upper case section 505.

The length of the lower came section 506 along the direction of the rotation center axis of the information medium 300 with respect to the step portion 505 is referred to as a protrusion amount. The protrusion amount shown in FIG. 5A is smaller than the protrusion amount shown in FIG. 5B. In FIG. 5B the lower case section 506 is connected to the step portion 507 through the opening 518, whereas in FIG. 5A the lower case section 506 is provided to directly extend from the step portion 507.

Figure 13A:
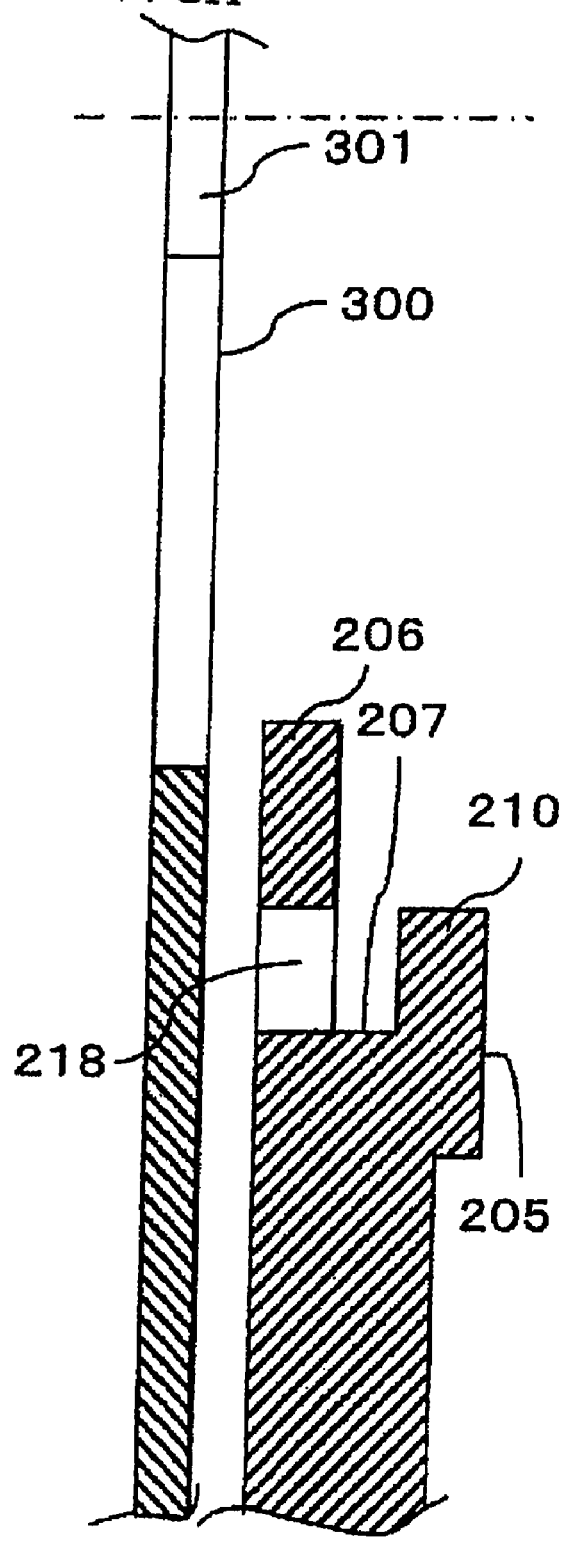
FIG. 13A is a cross-sectional view of the relevant parts of the center portion of the cartridge.
Figure 13B:
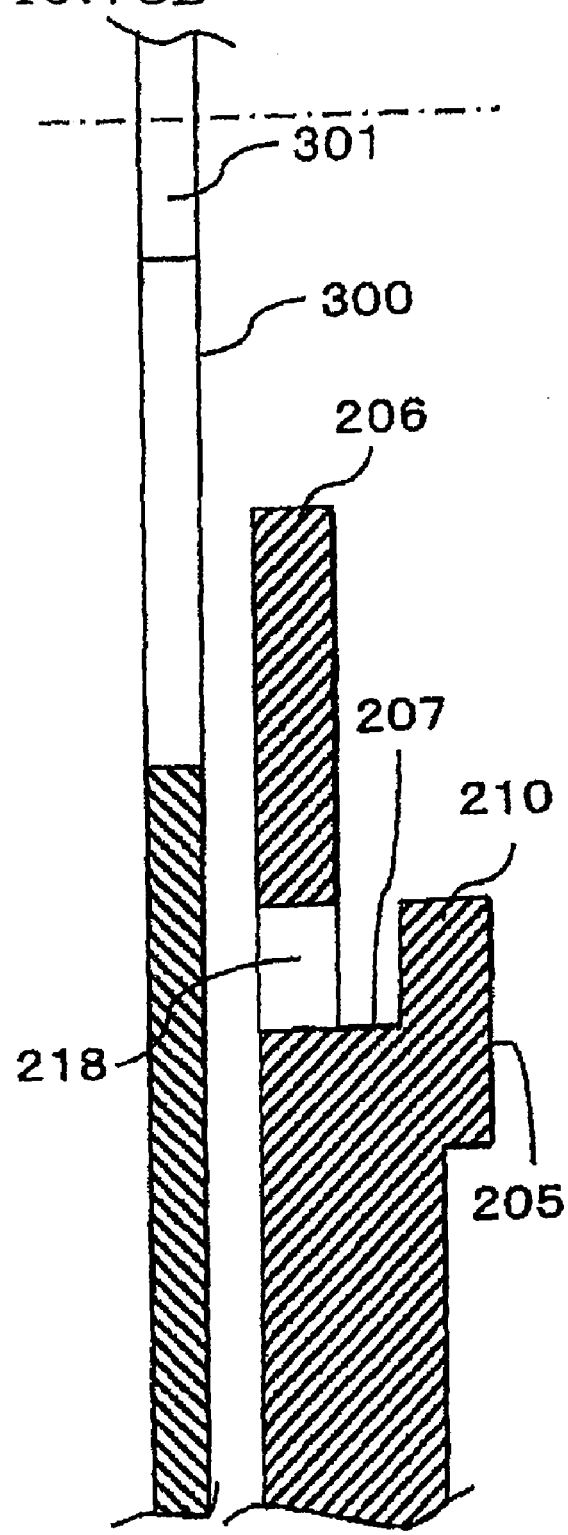
FIG. 13B is a cross-sectional view of the relevant parts of the peripheral portion of the window section of the cartridge.
Figure 14:
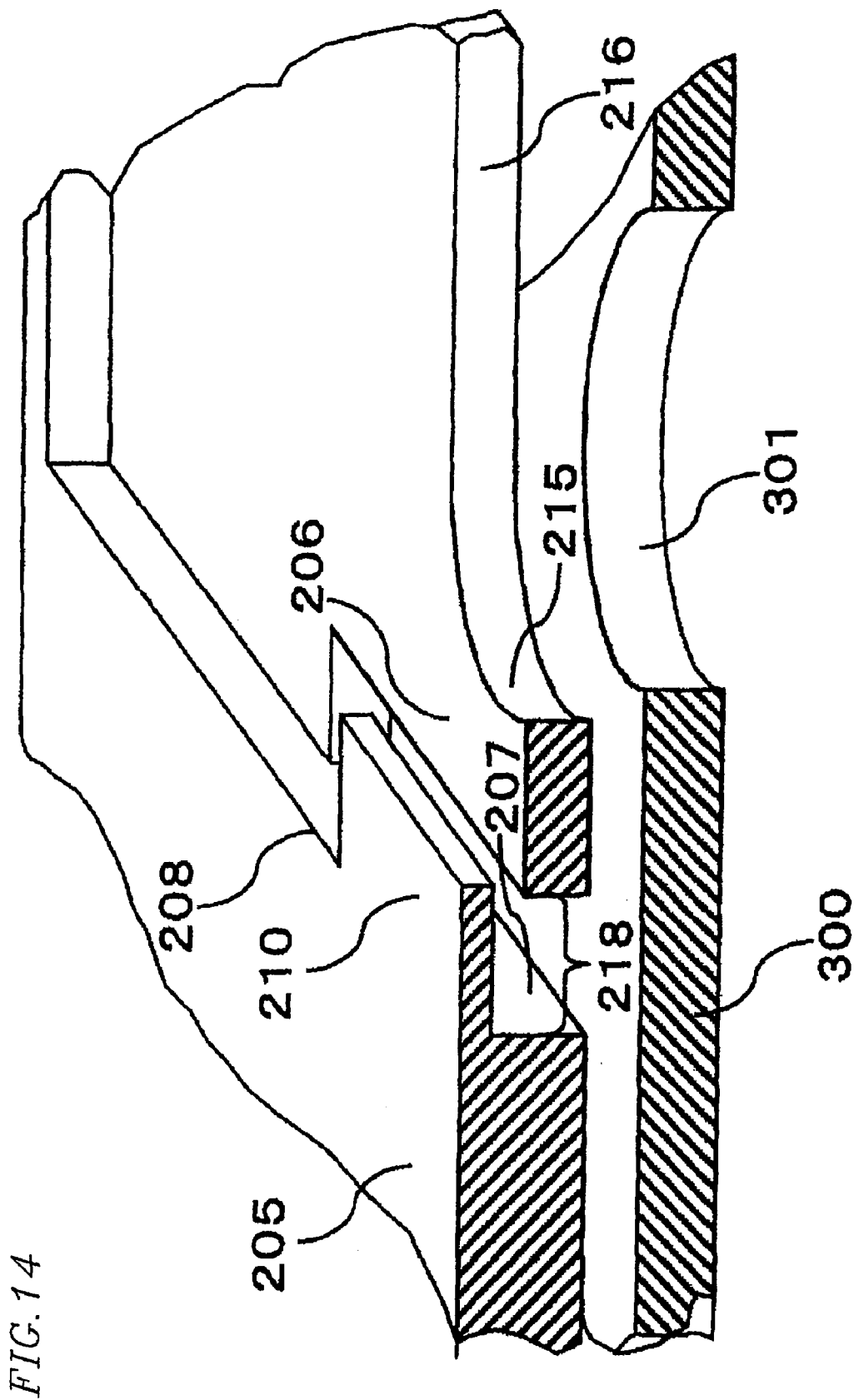
FIG. 14 is a perspective view of the relevant parts of a conventional cartridge.
Figure 15:
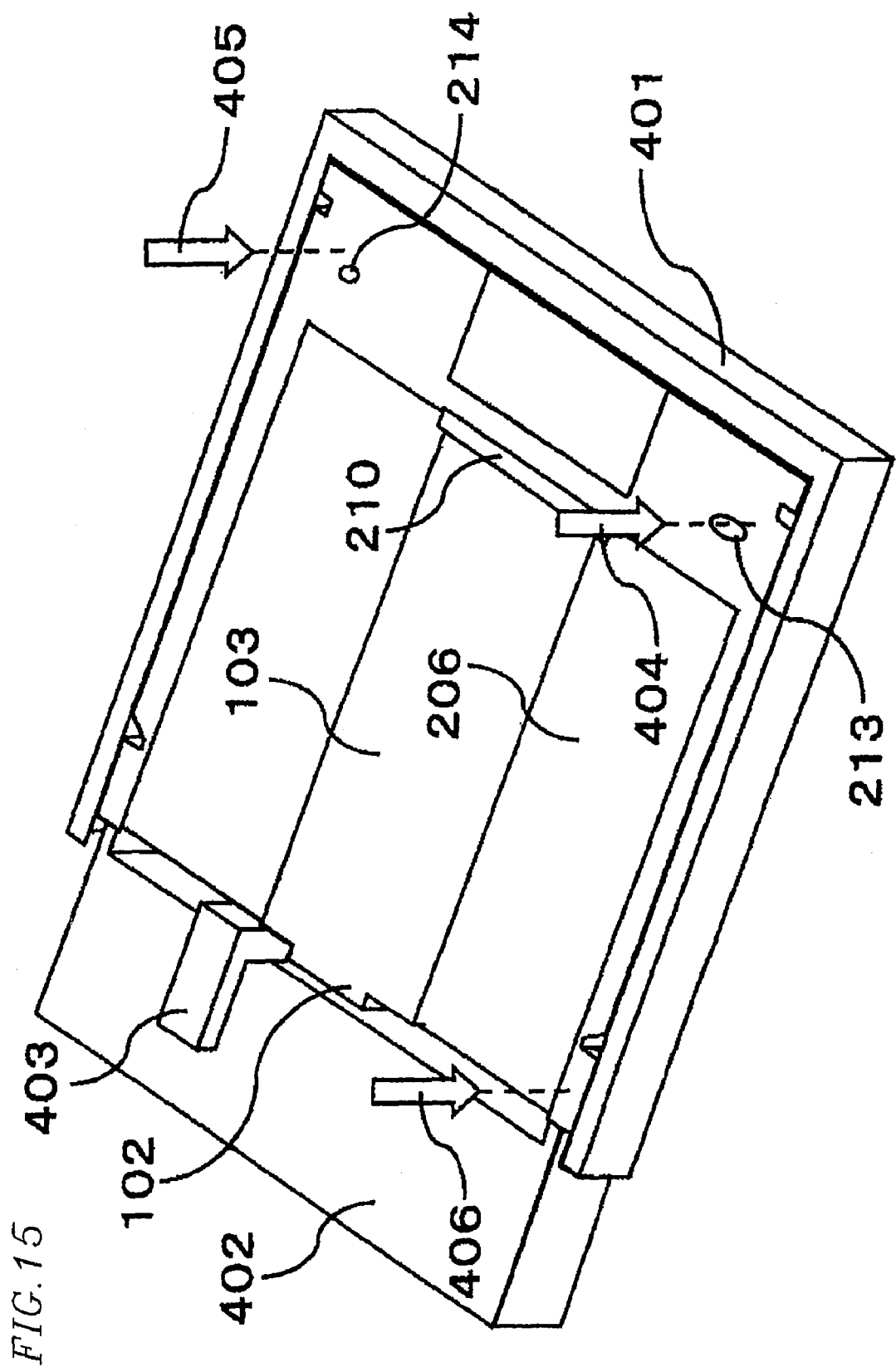
FIG. 15 is a perspective view illustrating the conventional cartridge in a state where the conventional cartridge is placed on a tray.
Figure 16:
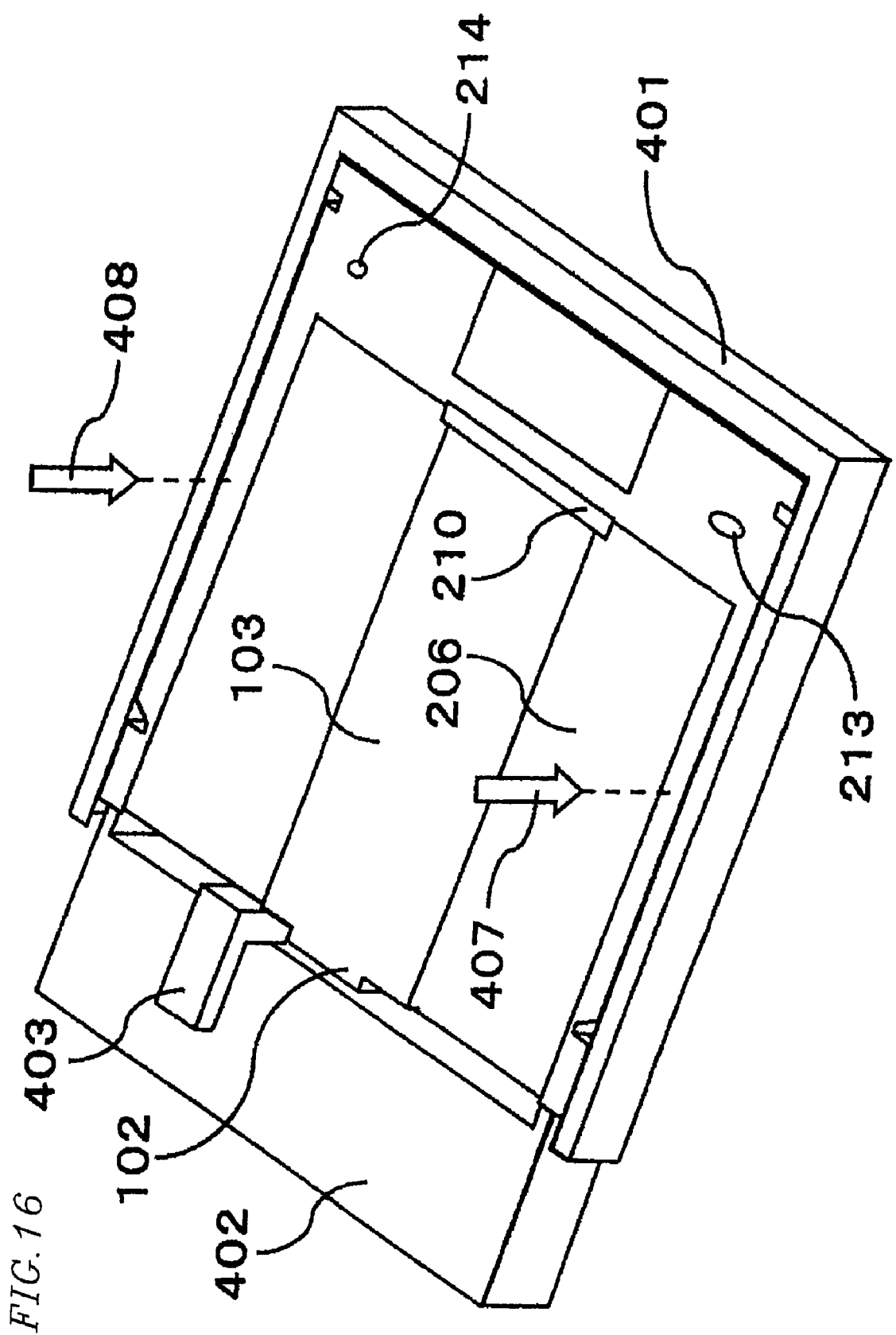
FIG. 16 is a perspective view illustrating the conventional cartridge in a state where the conventional cartridge is placed on a tray.

The dimensions applied to the cartridge of the present embodiment of the invention is basically the same as the dimensions described with reference to FIG. 13. The dimensions used in the present embodiment of the invention are as follows:

The thickness of the eaves section 510 is 0.4 mm; and the length of the eaves section 510 from the step portion 507 is 3.35 mm;

The gap between the eaves section 510 and the lower case section 506 along the thickness direction is 0.6 mm;

The length of the opening 518 from the step portion 507 is 3.85 mm;

The thickness of the lower case section 506 is 2 mm; the sum of the length of the connection portion 520 and the length of the lower case section 506 from the step portion 507 shown in FIG. 5A is 9.15 mm;

The gap between the lower case section 506 and the information medium 300 held between the turn table and the clamper along the thickness direction is 1.4 mm; and The thickness of the mount rib (not shown) provided in the vicinity of the surrounding of the rotation means entry section 515 is 0.2 mm.

In addition, it is difficult to simply define the possible range of the width of the eaves section 510, the opening 518 and the connection portion 520 in the present embodiment of the invention, since the dimensions of these are related to one another.

Further, the eaves section 510 is required to engage with the both sides of the window opening/closing section 103 in the width direction when the window opening/closing section 103 keeps the window section 502 in a closed state (When the window section 502 is in an open state, the risk of the window opening/closing section 103 becoming disengaged from the eave sections 510 can be reduced since a user carries the cartridge). The effect obtained by the connection portion 520 is described later. The window opening/closing section 103 is arranged to ride onto the adjacent surface of the lower case section 506 through the opening 518 in the process of sliding motion of the shutter member 100. In view of these aspects described above, it is preferable that the width of the connection portion 520 is approximately 5 mm to 10 mm, it is preferable that the width of the eaves section 510 is approximately 14 mm to 20 mm, it is preferable that the width of the opening 518 is approximately 15 mm to 21 mm, and it is preferable that the distance 519 between the eaves sections 510 is approximately 6 mm to 11 mm. In view of the preferable ranges described above, in the present embodiment of the invention, the width of the eaves section 510 is set to 19 mm, the width of the opening 518 is set to 20 mm, the width of the connection portion 520 is set to 7 mm, and the distance 519 between the eaves sections 510 is set to 8 mm.

Figure 6:
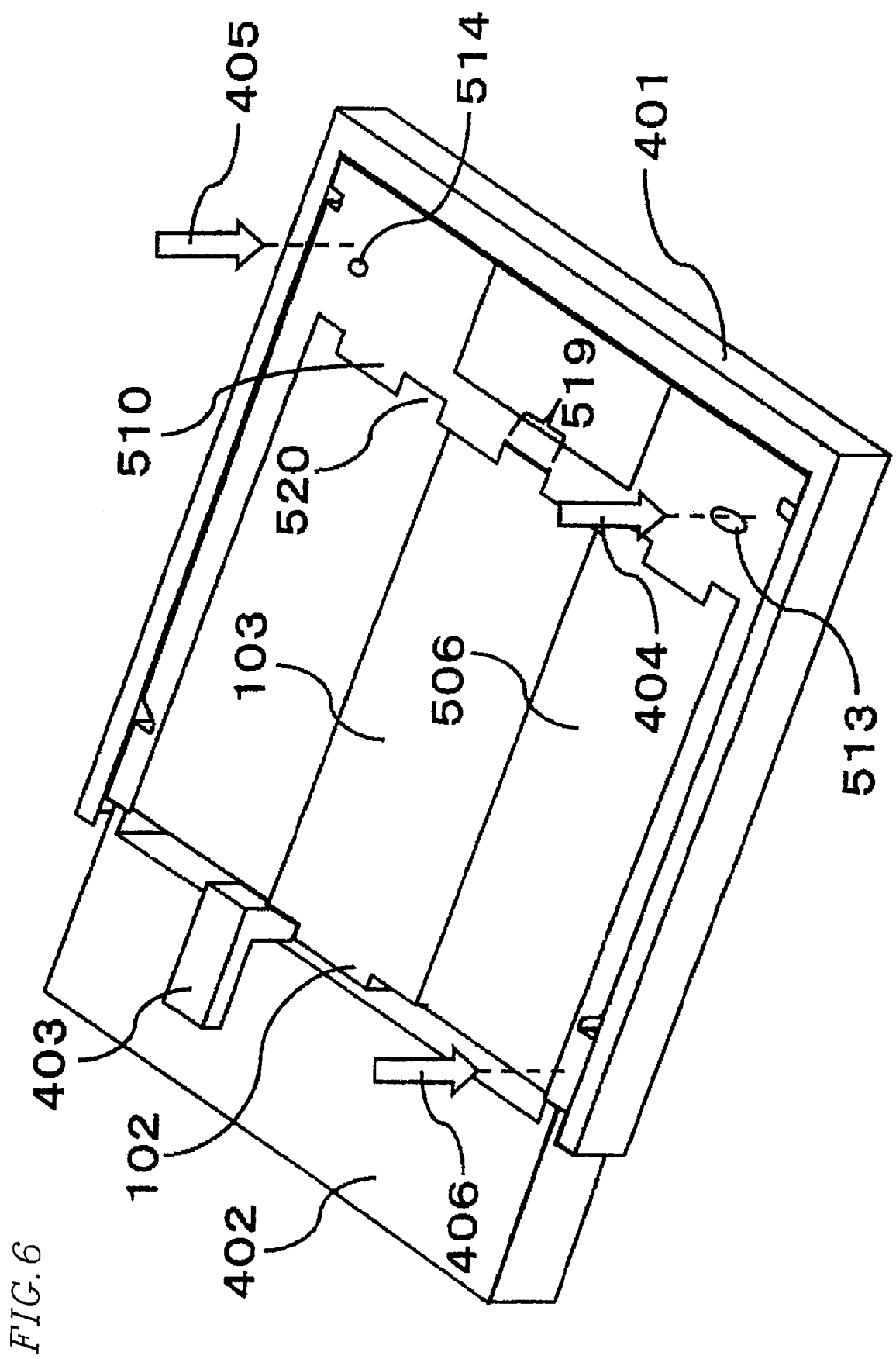
FIG. 6 is a perspective view illustrating the cartridge of the same embodiment in a state where the cartridge is placed on a tray.
Figure 7:
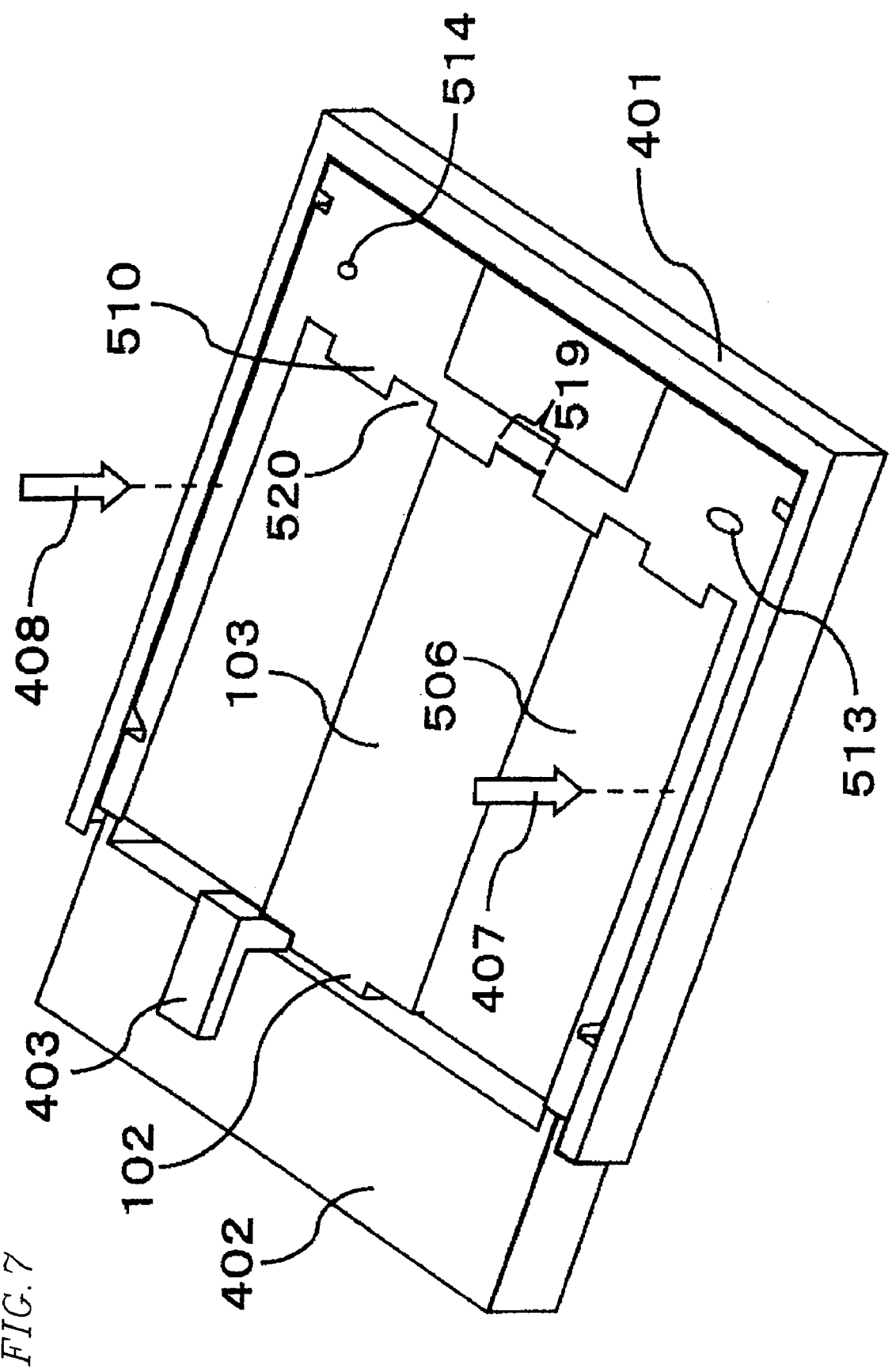
FIG. 7 is a perspective view illustrating the cartridge of the same embodiment in a state where the cartridge is placed on a tray.

In the cartridge of the present embodiment of the invention, the opening/closing operation of the shutter member 100 in a recording/reproduction device is performed while the cartridge is placed on the tray 401. Accordingly, as described above, in order to fix the position of the cartridge with respect to the tray 401, the pressing forces 404 to 406 are applied at the three points as shown in FIG. 6 or the pressing forces 407 and 408 are applied at the two points as shown in FIG. 7. The strength of the external forces to be applied to fix the position of the cartridge with respect to the tray 401, is approximately the same as that in the conventional cartridge.

Further, the distortion caused in the cartridge by integrally forming the upper half and the lower half or the internal stress caused in forming the upper half and the lower half by the injection molding process is also approximately the same as that in the conventional cartridge.

However, according to the cartridge of the present invention, it is possible to reduce the concentration of the resultant of forces, even if the external forces and the internal stress themselves are similar to those in the conventional cartridge. As a result, it is possible to restrict the sliding contact between the lower case section 506 and the information medium 300, the degradation of the sliding engagement between the eaves engagement section 104 and the eaves section 510, and the degradation of the sliding motion of the shutter member 100, due to the distortion of the cartridge. This function will be described with reference to FIG. 8.

Figure 8:
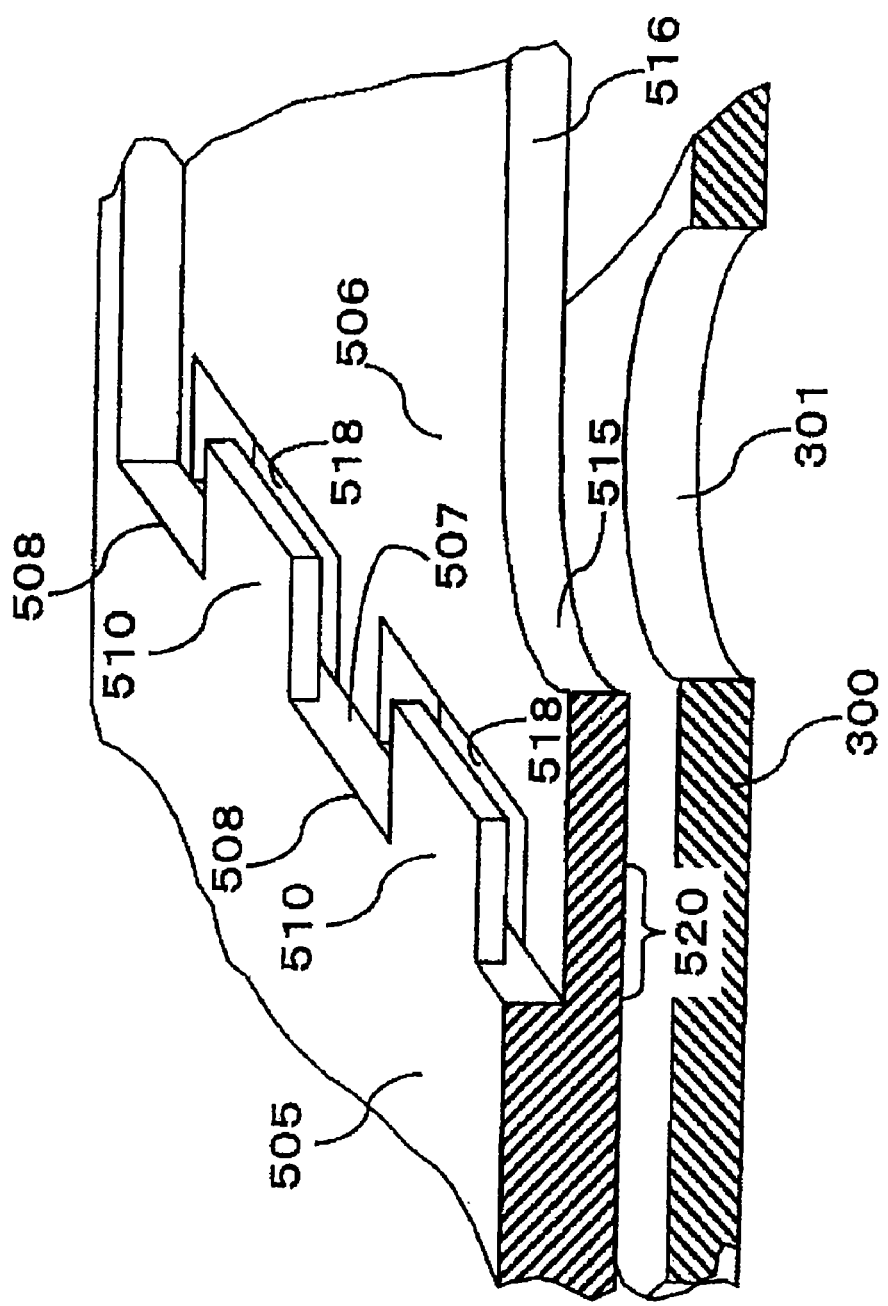
FIG. 8 is a perspective view of the relevant parts of the cartridge of the same embodiment.
Figure 9:
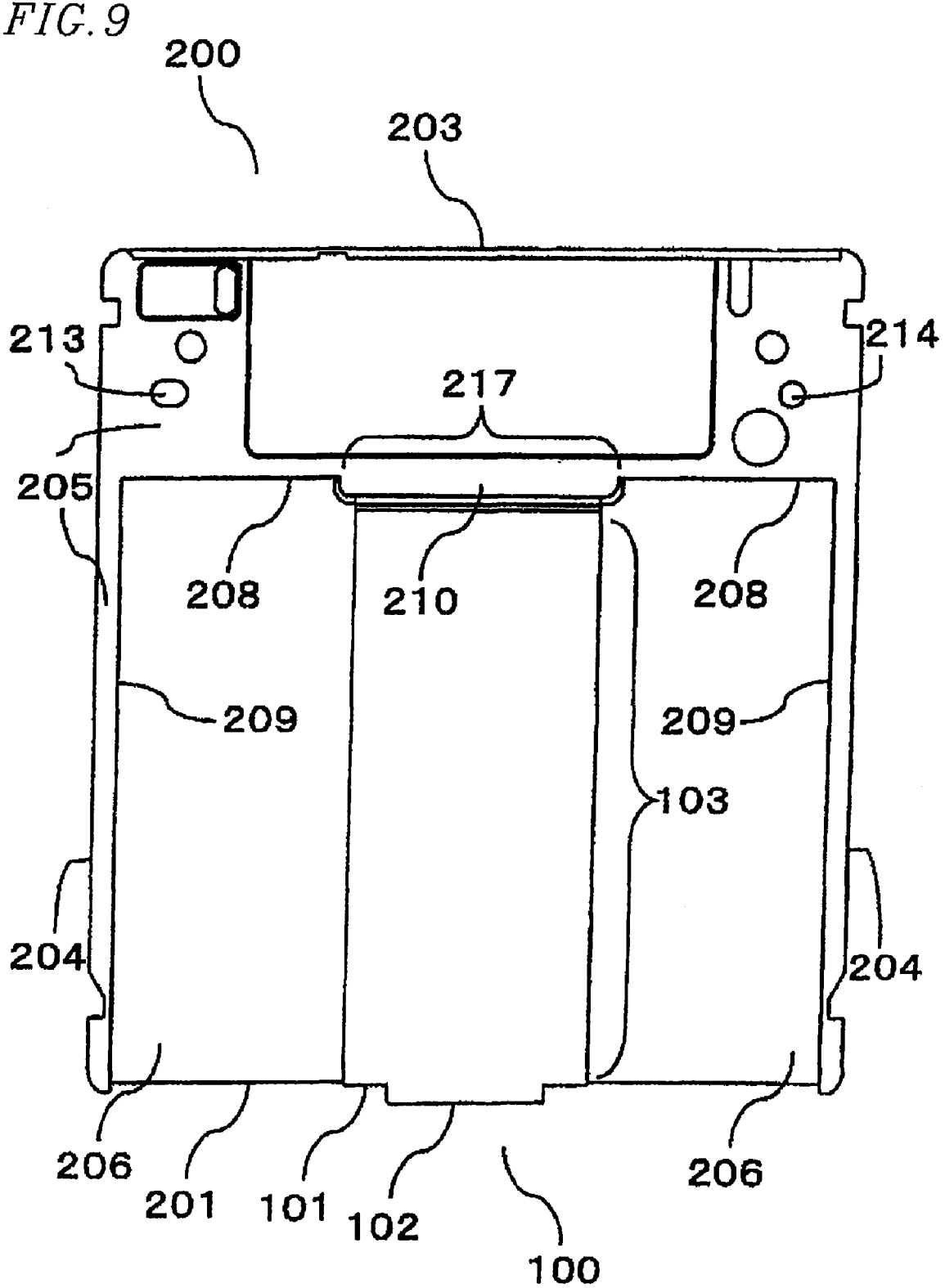
FIG. 9 is a plan view illustrating a conventional cartridge in a state where the window section is closed.
Figure 10:
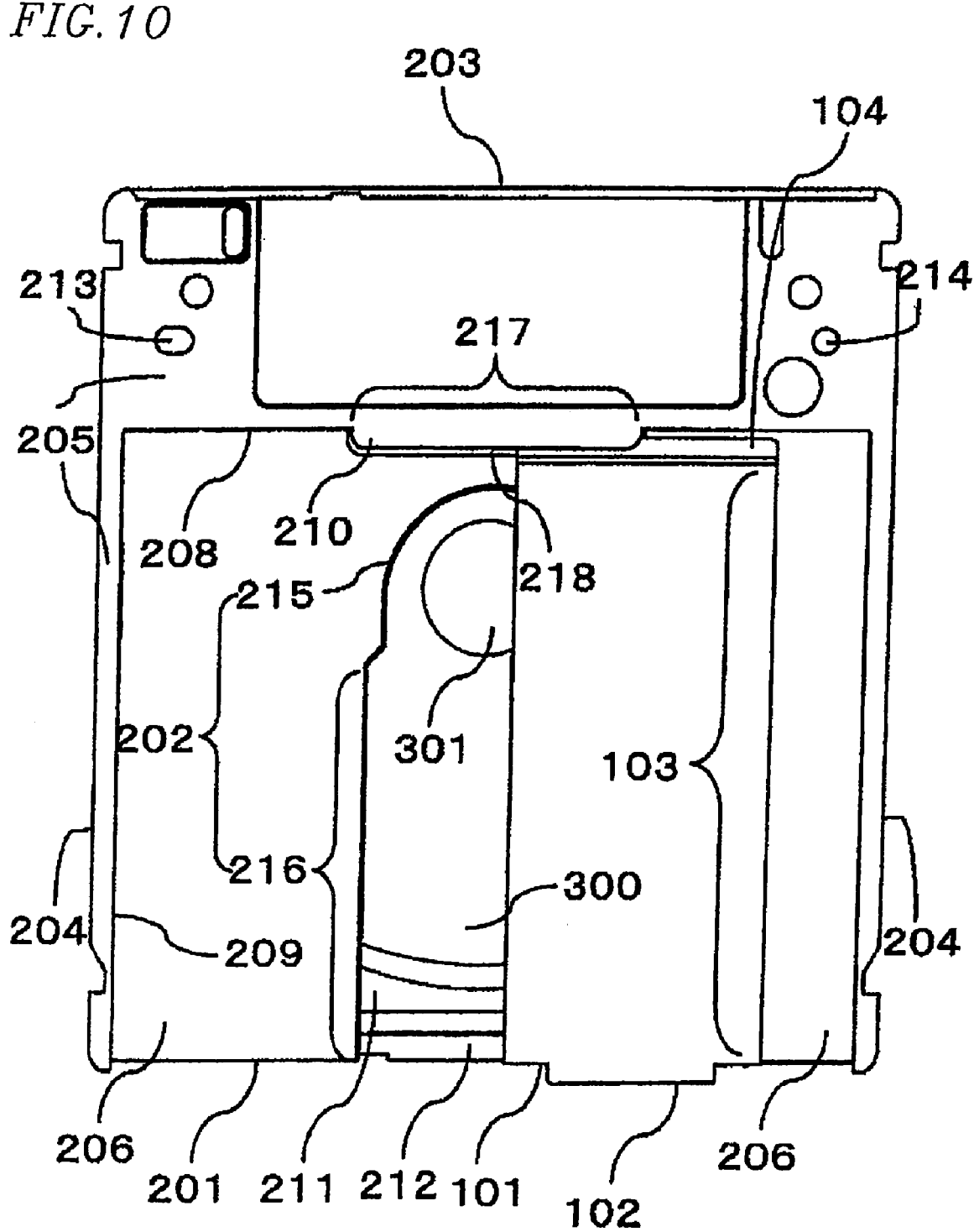
FIG. 10 is a plan view illustrating the conventional cartridge in a state where the window section is half opened.
Figure 11:
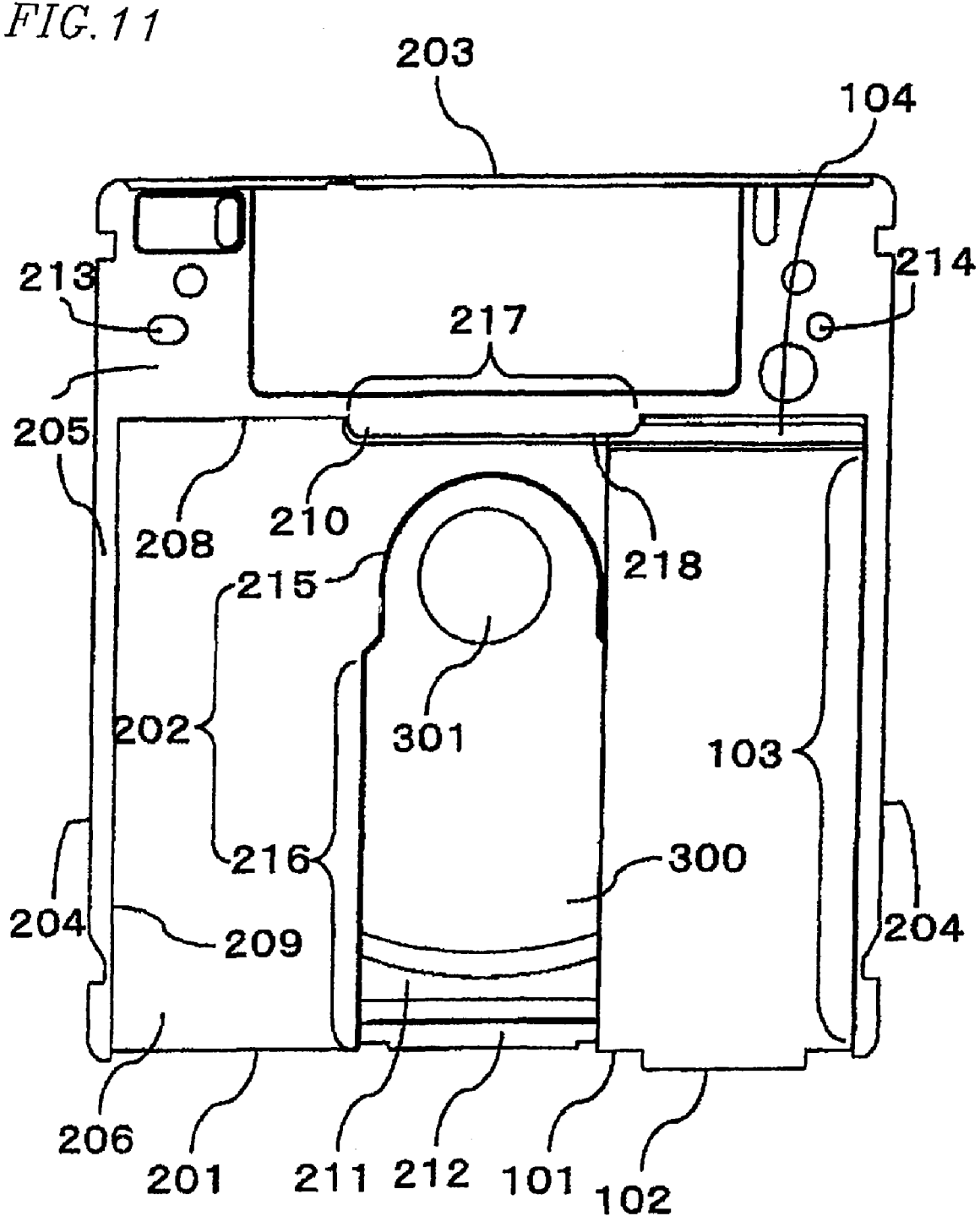
FIG. 11 is a plan view illustrating the conventional cartridge in a state where the window section is opened.
Figure 12:
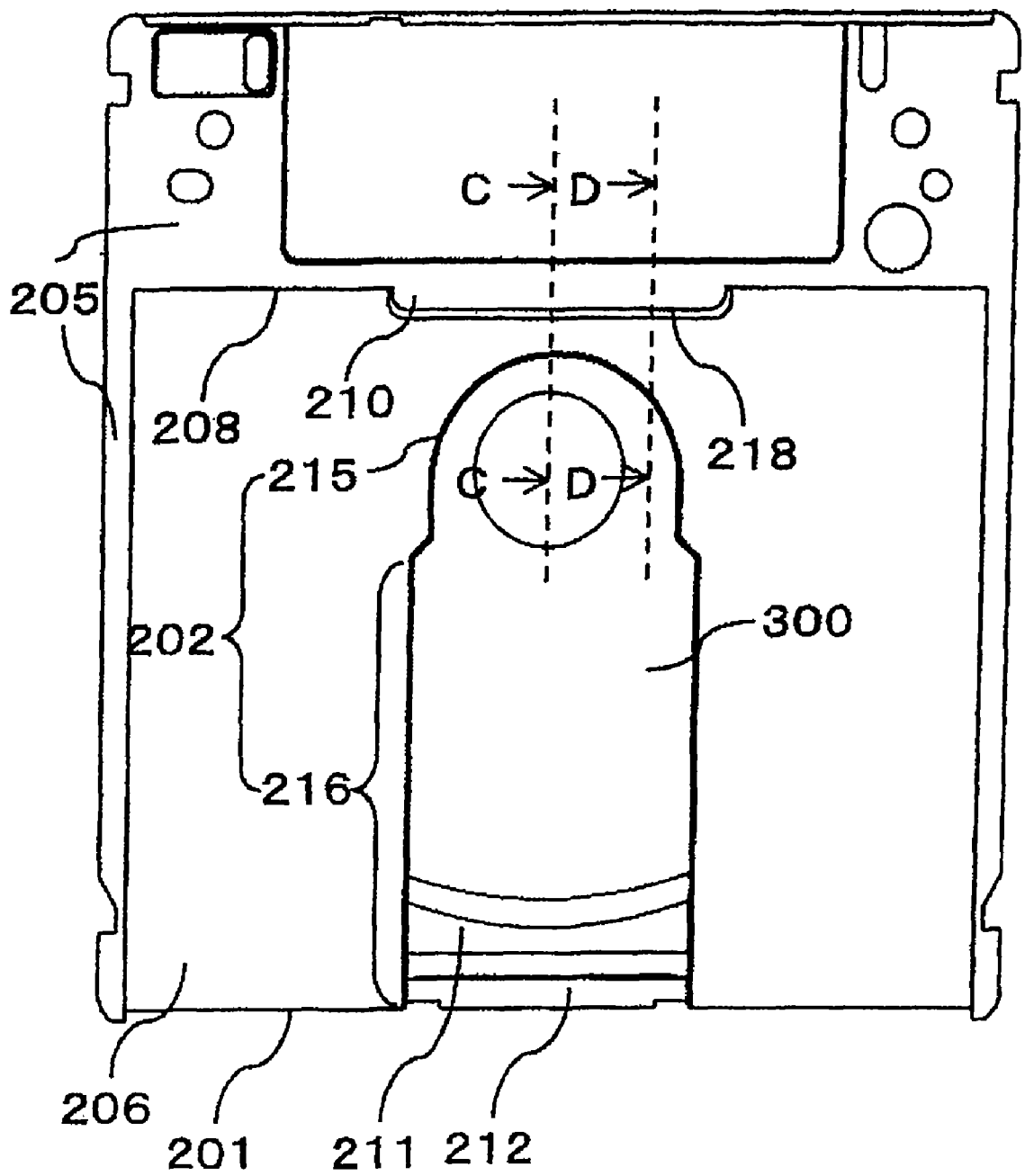
FIG. 12 is a plan view illustrating the cartridge with cutting lines in relation to FIGS. 13A and 13B.
Figure 17:
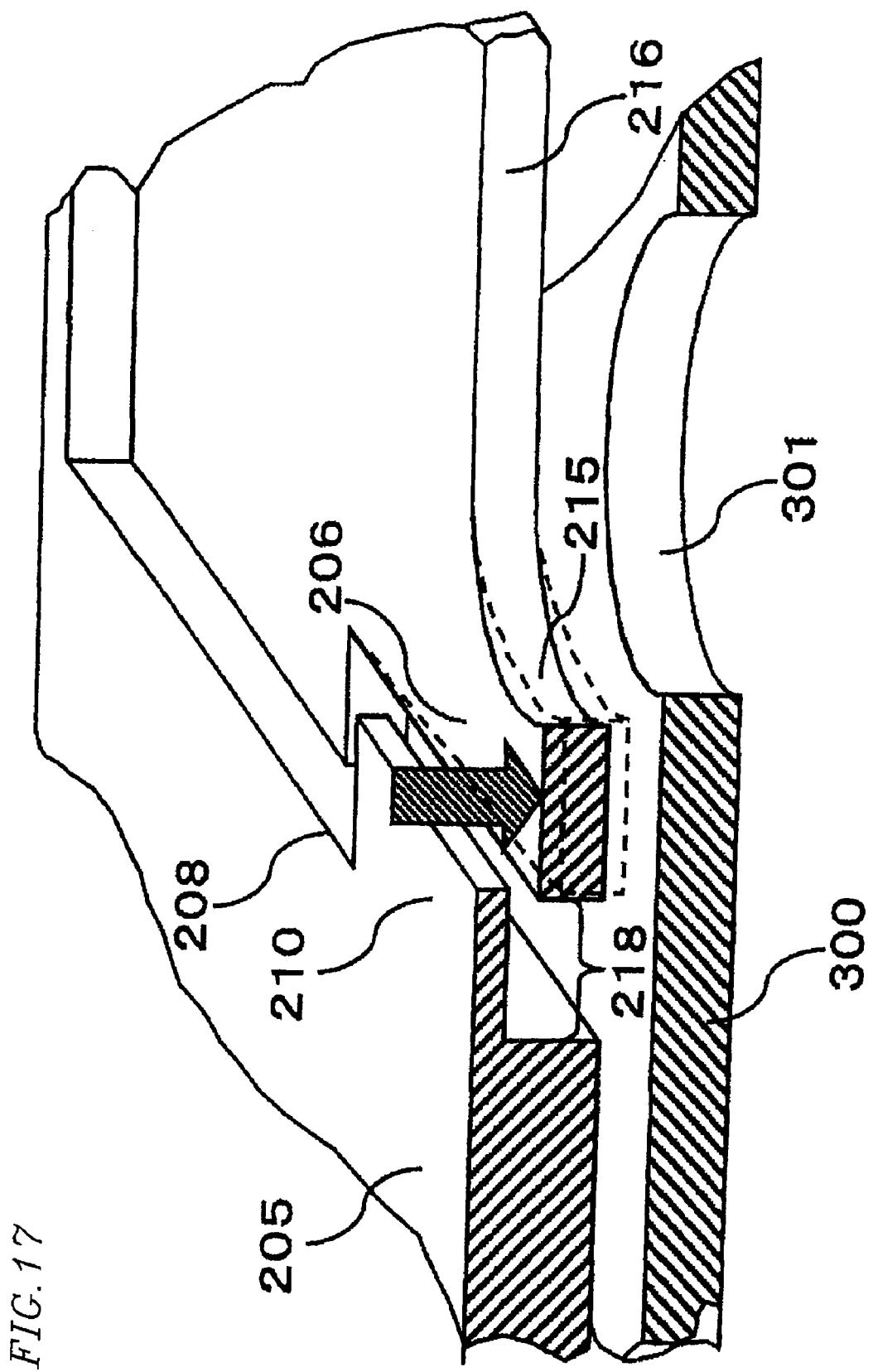
FIG. 17 is a perspective view of the relevant parts of the conventional cartridge for explaining the problems in the conventional cartridge.
Figure 18:
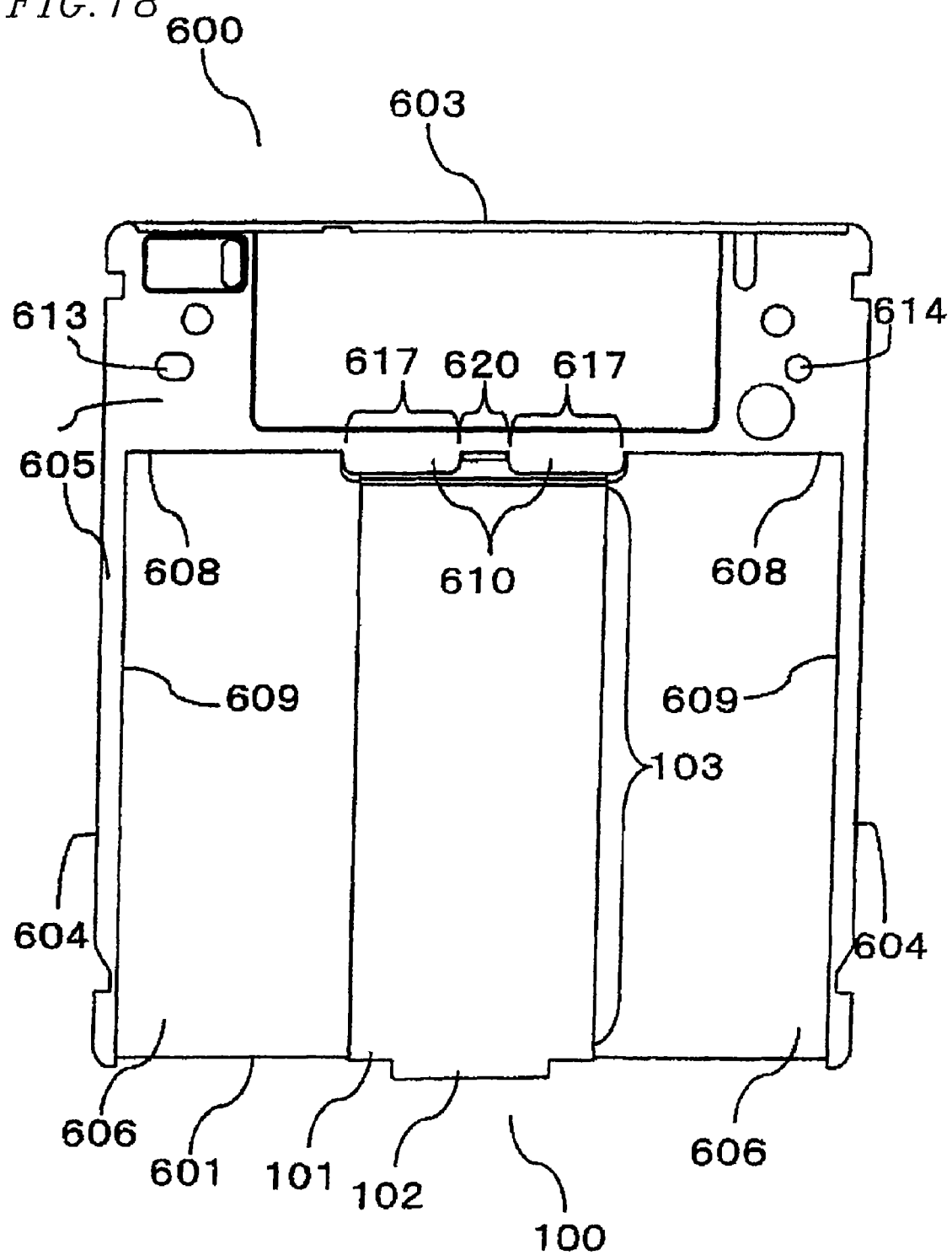
FIG. 18 is a plan view illustrating an cartridge of another embodiment according to the present invention, in a state where the window section is closed.
Figure 19:
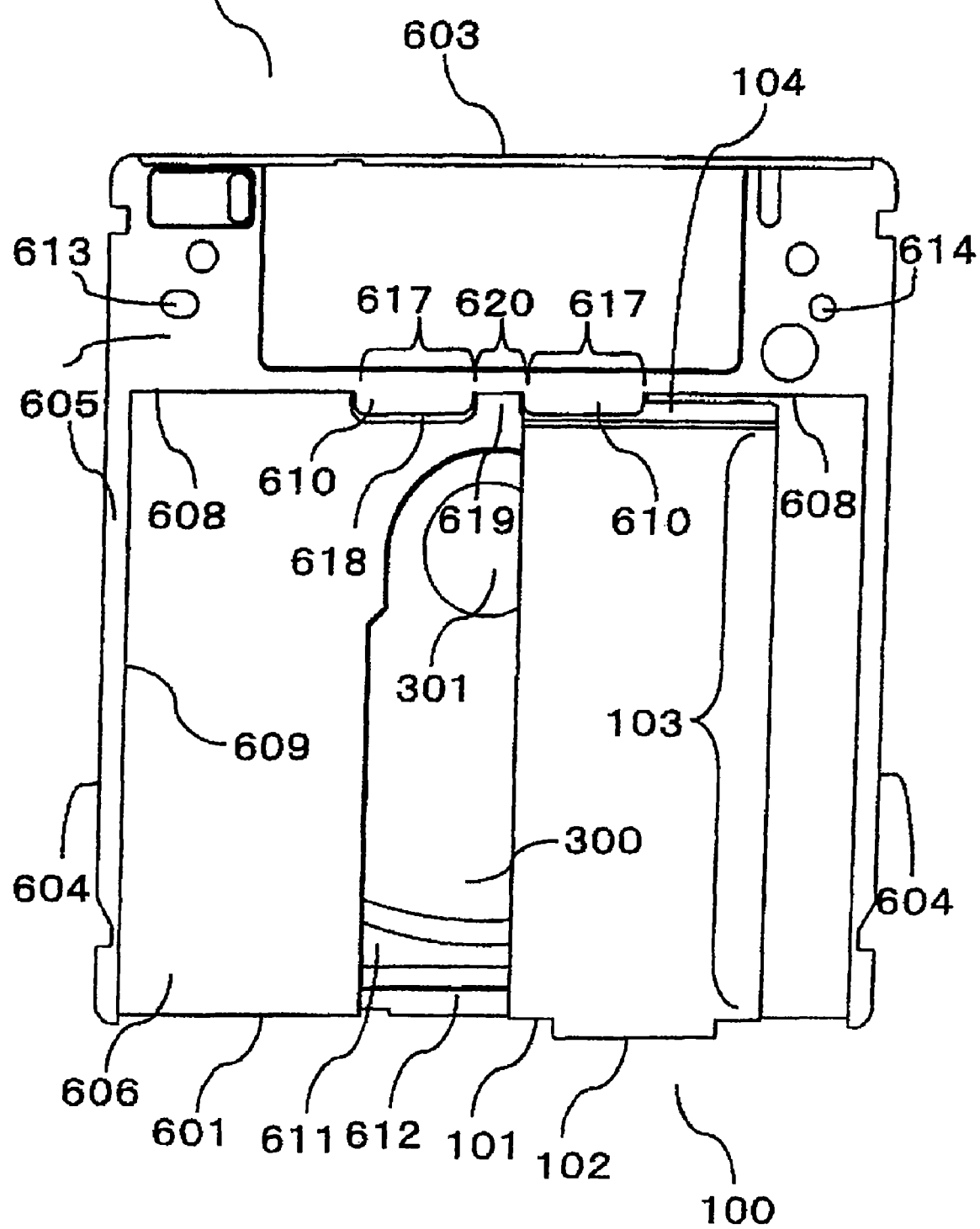
FIG. 19 is a plan view illustrating the cartridge of the same embodiment in a state where the window section is half opened.
Figure 20:
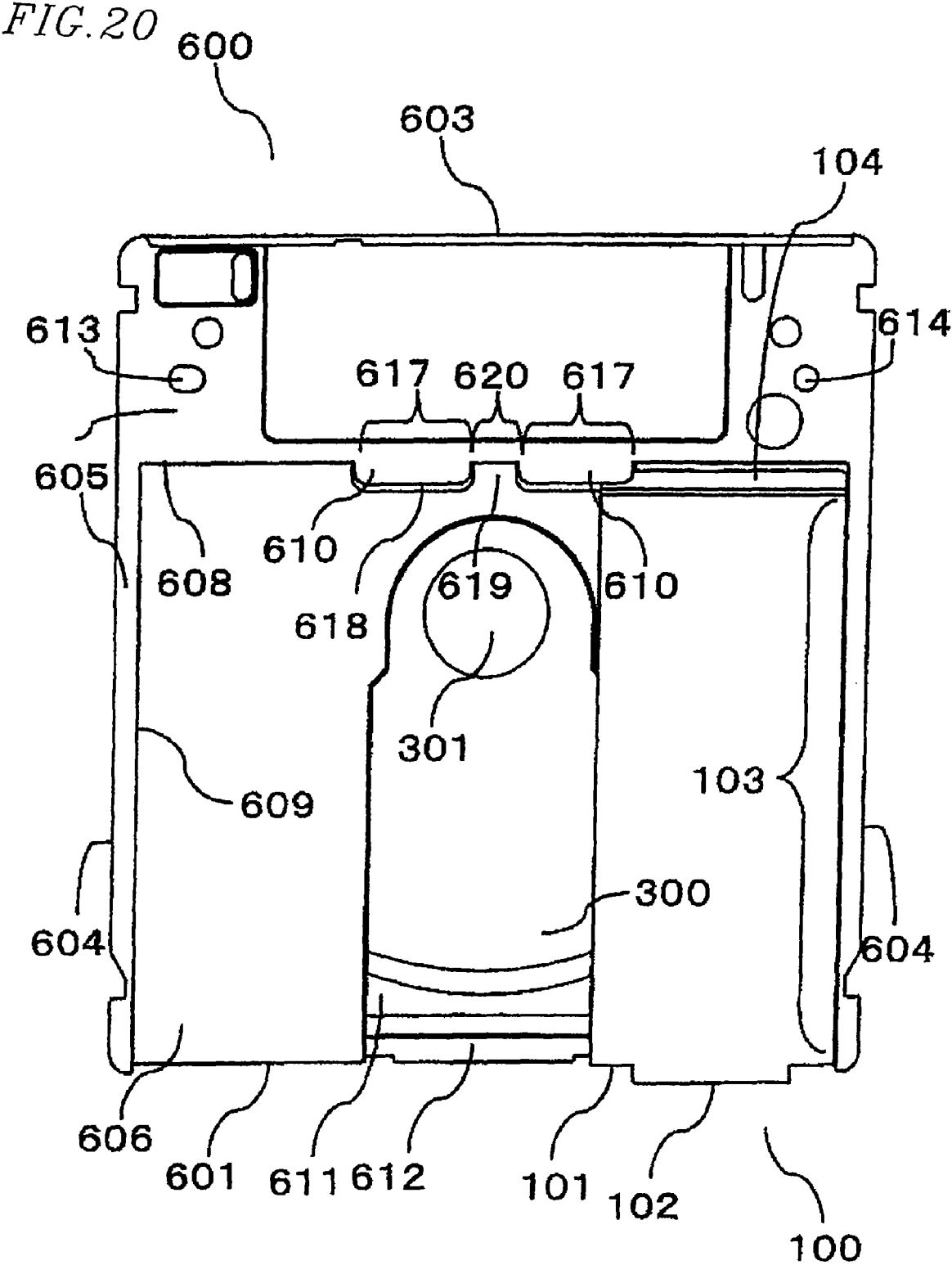
FIG. 20 is a plan view illustrating the cartridge of the same embodiment in a state where the window section is opened.

FIG. 8 is a perspective view of the relevant part of the cartridge having the cross-section shown in FIG. 5A. The lower case section 506 is connected to the step portion 507 through the connection portion 520. As a result, there is no distortion occurs in the cross-section of the cartridge by the concentration of the resultant forces of the external forces or the internal stress, contrary to the case described with reference to FIG. 17.

Specifically, the most fragile portion of the case member 500 of the present embodiment of the invention is the cross-section of the cartridge. However, the opening 518 does not go through the cross section of the cartridge, and the connection portion 520 extends from the step portion 507 having the thickness of the upper case section 505 so that the step portion 507 has great strength. As a result, the occurrence of the distortion can be restricted, even if the resultant of forces is concentrated into the most fragile portion of the case member 500. According to the cartridge having the structure described above in the present embodiment of the invention, it is possible to almost eliminate the defectives of the cartridge for storing the information medium 300, while maintaining the slidability of the shutter member 100.

In the present embodiment of the invention, the upper case section 505 has four eaves sections 510. When the window opening/closing section 103 slides along the sliding direction (i.e. either a direction towards the open state or a direction towards the closed state) in order to opens/closes the window section 202, a fore side end of the eaves engagement section 104 along the sliding direction passes over the opening 518 and the eaves section 510 one time each.

In general, the thickness of the eaves engagement section 104 is smaller than the thickness of the window opening/closing section 103, and the cross-section of the eaves engagement section 104 along a direction perpendicular to the sliding section has a tapered shape. The thickness of the top portion of the eaves engagement section 104, which is the thinnest part of the eaves engagement section 104, is very small, e.g. approximately 0.3 mm. This often causes a distortion in the eaves engagement section 104 when the shutter member 100 is formed and the like. It can be expected that there is a possibility that the eaves engagement section 104 may be in contact with the boundary 508 between the opening 518 and the lower case section 506 along the sliding direction or it may be in contact with the eaves section 510 along the sliding direction, depending on the direction of the distortion.

In addition, in view of the mechanical strength of the lower case section 506 and the step portion 507, it is preferable that the number of the openings 518 is smaller. There is also a possibility that foreign substances such as dust may enter into the case member 500 through the opening 518 which is not blocked by the eaves engagement section 104. In view of these possibilities, it is preferable that the number of the eaves sections 510 is as small as possible. This structure will be described with reference to FIGS. 18 to 21.

FIGS. 18 to 21 are plan views illustrating a structure of a cartridge of an embodiment according to the present invention. In this cartridge, the case member 600 includes two eaves sections 610 and one connection portion 619 on the center line of the case member 600 (i.e. the center line between a pair of the open/close position regulating sections 609, 609).

Figure 21:
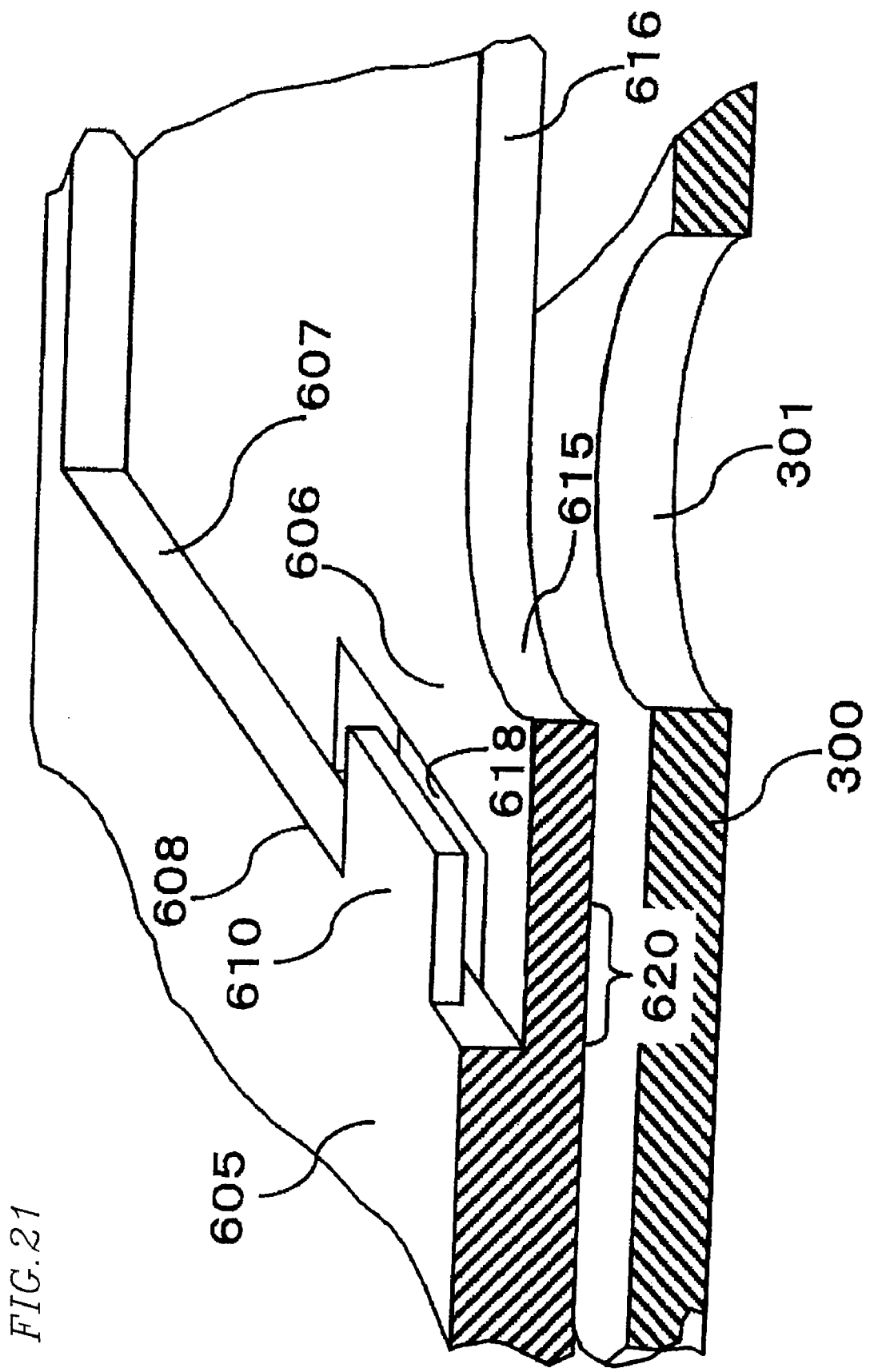
FIG. 21 is a perspective view of the relevant parts of the cartridge of the same embodiment.

The dimensions of the eaves sections 610, the opening 618 and the connection portion 619 are the same as those in the embodiment of the invention described above. As shown in FIG. 21, the concentration of the resultant of forces of the external forces and the internal stress is dispersed, like in the embodiment of the invention described above. As a result, it is possible to restrict the occurrence of the distortion even at the most fragile part of the cartridge.

Further, as long as the shutter member 100 does not slide in any direction, the eaves engagement section 104 always engages with the eaves section 610 to cover the opening 618. As a result, it is possible to actually eliminate the risk that foreign substances and the like enter into the case member 600 through the opening 618. The number of times for the eaves engagement section 104 to ride onto a different plane is only once in a direction towards the closed state, when the shutter member 100 slides along the sliding direction. Accordingly, it is possible to improve the reliability of the cartridge both in a stored state and in a shutter sliding state, while maintaining the effect of restricting initial malfunctions of the cartridge at substantially the same level as that in the embodiment of the invention described above.

In the embodiments of the invention described above, the thickness of the connection portion is the same as that of the lower case section. However, it is needless to say that the thickness of the connection portion may be smaller than that of the lower case section, as long as the mechanical strength of the connection portion itself is maintained. The connection portion can be practically used if the thickness of the connection portion is larger than or equal to half of the thickness of the lower case section.

Alternatively, it is possible that a projection plane obtained by projecting the eaves section onto the lower case section is connected to the step portion, in relation to the improvement of the precision level in processing molds used in the injection molding process. In this case, it is inevitable that the thickness of the projection plane is smaller than the thickness of the lower case section. Accordingly, the function and the effect of the connection portion of the present invention is equally effective.

Furthermore, in the embodiments of the invention described above, the plurality of eaves sections (i.e. the shutter pressing section) are located symmetrically with respect to the center line of the distance between the open position regulating sections. However, it is not intended to exclude any arrangement other than the symmetrical arrangement. For example, it is possible to adopt any structure so long as the relationship between the eaves sections and the eaves engagement section can be maintained, in either a case where the shutter member slides only one side of the case member, or a case where the shutter member slides to both sides of the case member. However, it is preferable to adopt the symmetrical arrangement because it is possible to guarantee the sliding properties of the shutter member and it is also possible to form the upper half and the lower half using the same mold.

Additionally, in the embodiments of the invention described above, the width of the connection portion is smaller than the width of the eaves section. This an arrangement is preferable in view of the sliding engagement of the eaves engagement section with the eave section. However, it is possible that the width of the connection portion is larger than the width of the eaves section. This arrangement is preferable in view of the restriction of the distortion of the cartridge due to the external forces or internal stress. Thus, the width of the connection portion and the width of the eaves section can be set to an appropriate value in view of various aspects.

As described above, the present invention is exemplified by the use of the preferred embodiments of the present invention. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention is useful for providing a case member, a cartridge and the like, capable of improving resistance against the distortion of the cartridge. According to the present invention, for example, it is possible to provide a lightweight, thin type cartridge which has a reduced thickness over the entire cartridge.

We claim:

1. A case member used in a cartridge including a shutter member, for storing an information medium having an information layer, the case member comprising:
   a lower case section including a sliding sidewall and a window section configured to allow at least a head to be inserted, the head being used to perform a recording operation or a reproduction operation for the information layer; and
   an upper case section including a rear sidewall which is opposite to the sliding sidewall, a pair of lateral sidewalls connected to the sidewall and the rear sidewall,
   wherein the shutter member includes:
   a sliding section operable to slide along the sliding sidewall of the case member;
   a window opening/closing section operable to open/close the window section of the case member in accordance with a sliding motion of the sliding section; and
   an eaves engagement section operable to engage with at least a part of the upper case section,
   wherein a step portion is formed at a boundary between the upper case section and the lower case section along the lateral sidewalls,
   the upper case section includes a plurality of eaves sections,
   each of the plurality of eaves sections is configured to engage with the eaves engagement section of the shutter member, at least two of the plurality of eaves sections are located spaced apart from each other by a predetermined distance,
   each of the at least two eaves sections, which are located spaced apart from each other by the predetermined distance, of the plurality of eaves sections, has a width along a direction in which the shutter member is operable to slide,
   the width is greater than the predetermined distance,
   the lower case section includes a connection portion, and
   the connection portion is connected to the step portion at a location between the at least two eaves sections, which are located spaced apart from each other by the predetermined distance, of the plurality of eaves sections and a surface of the connection portion and a surface of the lower case section form the same surface.

2. A case member according to claim 1, wherein: the connection portion is formed to have a planar shape.

3. A case member according to claim 1, wherein: an area obtained by projecting each of the plurality of eaves sections onto the lower case section is substantially equal to an area of an opening through the lower case section.

4. A case member according to claim 1, wherein: the plurality of eaves sections are located substantially symmetrically with respect to a center line connecting a center of the sliding sidewall to a center of the rear sidewall.

5. A case member according to claim 1, wherein:
the lower case section includes a connection portion formed on a center line connecting a center of the sliding sidewall to a center of the rear sidewall.

6. A case member according to claim 1, wherein:
the eaves engagement section of the shutter member is configured to engage with at least one of the plurality of the eaves sections, even if the shutter member is in an open state.

7. A cartridge comprising a case member for storing an information medium having an information layer and a shutter member,
wherein the case member includes:
a lower case section including a sliding sidewall and a window section configured to allow at least a head to be inserted, the head being used to perform a recording operation or a reproduction operation for the information layer; and
an upper case section including a rear sidewall which is opposite to the sliding sidewall, a pair of lateral sidewalls connected to the sidewall and the rear sidewall,
wherein the shutter member includes:
a sliding section operable to slide along the sliding sidewall of the case member;
a window opening/closing section operable to open/close the window section of the case member in accordance with a sliding motion of the sliding section; and
an eaves engagement section operable to engage with at least a part of the upper cane section,
wherein a step portion is formed at a boundary between the upper case section and the lower case section along the lateral sidewalls,
the upper case section includes a plurality of eaves sections,
each of the plurality of eaves sections is configured to engage with the eaves engagement section of the shutter member, at least two of the plurality of eaves sections are located spaced apart from each other by a predetermined distance,
each of the at least two eaves sections, which are located spaced apart from each other by the distance, of the plurality of eaves sections, has a width along a direction in which the shutter member is operable to slide,
the width is greater than the distance,
the lower case section includes a connection portion,
the connection portion is connected to the step portion at a location between the at least two eaves sections, which are located spaced apart from each other by the predetermined distance, of the plurality of eaves sections and a surface of the connection portion and a surface of the lower case section form the same surface.

8. A cartridge according to claim 7, wherein:
the connection portion is formed to have a planar shape.

9. A cartridge according to claim 7, wherein:
an area obtained by projecting each of the plurality of eaves sections onto the lower case section is substantially equal to an area of an opening through the lower case section.

10. A cartridge according to claim 7, wherein:
the plurality of eaves sections are located substantially symmetrically with respect to a center line connecting a center of the sliding sidewall to a center of the rear sidewall.

11. A cartridge according to claim 7, wherein:
the lower case section includes a connection portion formed on a center line connecting a center of the sliding sidewall to a center of the rear sidewall.

12. A cartridge according to claim 7, wherein:
the eaves engagement section of the shutter member is configured to engage with at least one of the plurality of the eaves sections, even if the shutter member is in an open state.

* * * * *